(12) United States Patent
Chen

(10) Patent No.: US 12,468,495 B2
(45) Date of Patent: Nov. 11, 2025

(54) PAGE DISPLAY METHOD AND APPARATUS

(71) Applicant: Petal Cloud Technology Co., Ltd., Dongguan (CN)

(72) Inventor: Jianqiang Chen, Dongguan (CN)

(73) Assignee: Petal Cloud Technology Co., Ltd., Dongguan (CN)

( * ) Notice: Subject to any disclaimer, the term of this patent is extended or adjusted under 35 U.S.C. 154(b) by 206 days.

(21) Appl. No.: 18/558,127

(22) PCT Filed: Apr. 25, 2022

(86) PCT No.: PCT/CN2022/089108
§ 371 (c)(1),
(2) Date: Oct. 30, 2023

(87) PCT Pub. No.: WO2022/228403
PCT Pub. Date: Nov. 3, 2022

(65) Prior Publication Data
US 2024/0220177 A1    Jul. 4, 2024

(30) Foreign Application Priority Data

Apr. 30, 2021 (CN) .......................... 202110486390.8

(51) Int. Cl.
*G06F 3/048* (2013.01)
*G06F 3/0481* (2022.01)
(Continued)

(52) U.S. Cl.
CPC .............. *G06F 3/14* (2013.01); *G06F 3/0481* (2013.01); *G06F 3/0484* (2013.01);
(Continued)

(58) Field of Classification Search
CPC .... G06F 3/0484; G06F 3/0481; G06F 16/955; G06F 3/14; G06F 16/172; G06F 9/445;
(Continued)

(56) References Cited

U.S. PATENT DOCUMENTS

| 5,978,828 A |  | 11/1999 | Greer et al. |
| 8,954,004 B1 | * | 2/2015 | Wang ...................... G06F 21/41 |
|  |  |  | 455/410 |

(Continued)

FOREIGN PATENT DOCUMENTS

| CN | 2925294 Y | 7/2007 |
| CN | 201422690 Y | 3/2010 |

(Continued)

*Primary Examiner* — Linh K Pham
(74) *Attorney, Agent, or Firm* — Leydig, Voit & Mayer, Ltd.

(57) ABSTRACT

This application provides a page display method and apparatus, and relates to the field of data transmission. The method includes: performing, by a terminal device, a first interaction operation with a first object; downloading, by the terminal device, the corresponding first file from a server based on the identification information of the first file; storing, by the terminal device, the first file, and displaying a corresponding first page based on the first file; receiving, by the terminal device, a first operation, where the first operation is an operation of opening the first page by a user; and displaying, by the terminal device, the first page again in response to the first operation.

19 Claims, 26 Drawing Sheets

(51) Int. Cl.
*G06F 3/0484* (2022.01)
*G06F 3/14* (2006.01)
*G06K 19/06* (2006.01)
*G06K 19/07* (2006.01)
*H04L 67/06* (2022.01)
*G06F 3/0488* (2022.01)

(52) U.S. Cl.
CPC ... *G06K 19/06037* (2013.01); *G06K 19/0723* (2013.01); *H04L 67/06* (2013.01); *G06F 3/0488* (2013.01)

(58) Field of Classification Search
CPC ..... G06F 3/048; H04L 67/06; G06Q 30/0623; G06Q 30/0641; G06Q 30/0633; G06K 19/0723; G06K 19/06037
See application file for complete search history.

(56) References Cited

U.S. PATENT DOCUMENTS

| | | | | |
|---|---|---|---|---|
| 2013/0090131 A1* | 4/2013 | Jalkanen | ................ | H04W 4/80 455/456.1 |
| 2014/0247991 A1* | 9/2014 | Archuleta | ................ | G06K 1/18 235/375 |
| 2014/0250390 A1 | 9/2014 | Holmes et al. | | |
| 2014/0367463 A1* | 12/2014 | Cibor | ................. | G06Q 10/0833 235/375 |
| 2015/0112790 A1* | 4/2015 | Wolinsky | ........... | G06Q 20/3274 705/14.38 |
| 2015/0310421 A1* | 10/2015 | Xie | ...................... | G06Q 20/401 705/44 |
| 2016/0255161 A1* | 9/2016 | Lim | ................... | G06Q 30/0207 455/456.3 |
| 2017/0085619 A1 | 3/2017 | Cai et al. | | |
| 2019/0281124 A1* | 9/2019 | Lim | ...................... | H04W 4/02 |
| 2020/0099772 A1* | 3/2020 | Ray | ......................... | H04L 67/60 |
| 2020/0344115 A1* | 10/2020 | Power | .................... | H04L 67/34 |
| 2021/0035086 A1* | 2/2021 | Khan | ................... | G06Q 20/204 |
| 2021/0042734 A1* | 2/2021 | Malhotra | ........... | G06Q 20/3276 |
| 2022/0188804 A1* | 6/2022 | Dowd | ................. | G06Q 20/322 |

FOREIGN PATENT DOCUMENTS

| | | |
|---|---|---|
| CN | 102831186 A | 12/2012 |
| CN | 104318194 A | 1/2015 |
| CN | 107329985 A | 11/2017 |
| CN | 109408086 A | 3/2019 |
| CN | 110008423 A | 7/2019 |
| CN | 111061540 A | 4/2020 |
| CN | 111127032 A | 5/2020 |

* cited by examiner

PAGE DISPLAY METHOD AND APPARATUS

CROSS-REFERENCE TO RELATED APPLICATIONS

This application is a national stage of International Application No. PCT/CN2022/089108, filed on Apr. 25, 2022, which claims priority to Chinese Patent Application No. 202110486390.8, filed on Apr. 30, 2021. Both of the aforementioned applications are hereby incorporated by reference in their entireties.

TECHNICAL FIELD

Embodiments of this application relate to the field of data transmission, and in particular, to a page display method and apparatus.

BACKGROUND

Currently, a mainstream manner in which a terminal device displays a third-party page to a user is as follows: The terminal device scans a two-dimensional code corresponding to the third-party page, obtains a link of the third-party page included in the two-dimensional code, and then obtains the third-party page based on the link of the third-party page and displays the third-party page. For example, in an implementation scenario, the terminal device may be a mobile phone, and the third-party page may be a commodity purchase page. The commodity purchase page may include commodity purchase information such as a commodity picture and a commodity price. The user may use the mobile phone to scan a two-dimensional code corresponding to the commodity purchase page. The mobile phone may obtain a link of the commodity purchase page included in the two-dimensional code, and then obtain the commodity purchase page based on the link and display the commodity purchase page.

However, in the foregoing manner in which the terminal device displays the third-party page, a process in which the terminal device scans the two-dimensional code corresponding to the third-party page is non-reproducible. When the user wants to view the third-party page again, the user needs to use the terminal device to rescan the two-dimensional code corresponding to the third-party page. For example, after the user uses the mobile phone to scan the two-dimensional code corresponding to the commodity purchase page, and views the commodity purchase page, when the user wants to view the commodity purchase page again, the user needs to use the mobile phone to rescan the two-dimensional code corresponding to the commodity purchase page. If the two-dimensional code corresponding to the commodity purchase page does not exist on site, the mobile phone possibly cannot display the commodity purchase page to the user again.

SUMMARY

Embodiments of this application provide a page display method and apparatus, to resolve a problem, in the conventional technology, that a user cannot repeatedly view a third-party page because a display process of the third-party page is non-reproducible.

According to a first aspect, an embodiment of this application provides a page display method. The method may be applied to a terminal device. The terminal device is connected to a server. The server includes at least one first file, and the first file is related to a first page. The method includes: The terminal device performs a first interaction operation with a first object, to obtain identification information that is of the first file and that is included in the first object. The terminal device downloads the corresponding first file from the server based on the identification information of the first file. The terminal device stores the first file, and displays the corresponding first page based on the first file. The terminal device receives a first operation. The first operation is an operation of opening the first page by a user. The terminal device displays the first page again in response to the first operation.

The first object may be an NFC tag, a device including an NFC tag, a two-dimensional code label, a device capable of displaying a two-dimensional code, or a first electronic device that wirelessly communicates with the terminal device.

For example, the first object is an NFC tag or a device into which an NFC tag is embedded. In this case, that the terminal device performs a first interaction operation with a first object, to obtain identification information that is of the first file and that is included in the first object may mean that the terminal device touches (or approaches) the NFC tag or the device into which an NFC tag is embedded, to obtain the identification information that is of the first file and that is included in the NFC tag or the device into which an NFC tag is embedded. It may be understood that the terminal device also has an NFC tag, for example, an NFC chip.

For example, the first file may include the identification information of the first file. The identification information of the first file may be a page name, a page ID, or the like of the first page.

The first page may be a third-party page. For example, the first page may include any one of the following: a commodity purchase page, an advertisement page, a web page, a payment page, an official account page, a video display page, and an article display page.

In the method, the terminal device stores the first file. Therefore, when the user needs to view the first page again, the user may perform an operation (for example, the first operation) of opening the first page on the terminal device. The terminal device may display the first page again based on the first file in response to the operation of opening the first page by the user, to reproduce the first page.

Optionally, the first file may be a file package including content of the first page. The file package may be in a plurality of formats. When downloading the first file from the server, the terminal device may download the first file in a format that is adapted to an operating system of the terminal device from the server based on the operating system of the terminal device.

For example, the format of the first file may include an APK format, an IPA format, a PXL format, a DEB format, a DMG format, or an EXE format. The operating system of the terminal device may be a Harmony™ system, an Android™ system, an iOS™ system, a Mac™ system, a Windows™ system, or the like.

When the operating system of the terminal device is the Harmony™ system or the Android™ system, the terminal device may download the first file in the APK format from the server. When the operating system of the terminal device is the iOS™ system, the terminal device may download the first file in the IPA format, the PXL format, or the DEB format from the server. When the operating system of the terminal device is the Mac™ system, the terminal device may download the first file in the DMG format from the server. When the operating system of the terminal device is the Windows™ system, the terminal device may download the first file in the EXE format from the server.

Optionally, the method further includes: The terminal device learns, from the server based on the identification information of the first file, whether the first file is updated. When the first file is updated, the terminal device displays an update reminder of the first file.

The terminal device may query, by using an interface based on a preset period, whether the first file is updated in the server. The preset period may be 1 minute, 5 minutes, 10 minutes, 1 day, 2 days, or the like.

When the first file is updated, the terminal device displays the update reminder of the first file, to remind the user to actively update the first file.

For example, the method further includes: The terminal device receives a second operation. The terminal device downloads a second file from the server in response to the second operation. The second file is a file obtained after the first file is updated. The terminal device replaces the first file with the second file.

Optionally, the method further includes: The terminal device learns, from the server based on the identification information of the first file, whether the first file is updated. When the first file is updated, the terminal device automatically downloads a second file from the server. The second file is a file obtained after the first file is updated. The terminal device replaces the first file with the second file.

In this embodiment, when updating the first page, a provider of the first page may make an updated first page into an updated first file (namely, the second file) in a timely manner, and re-upload the updated first file to the server. The terminal device may detect an update status of the first file in a timely manner, and update the stored first file. Therefore, the first page displayed by the terminal device to the user based on the first file has time validity.

Optionally, the terminal device includes a silent upgrade switch. That the terminal device automatically downloads a second file from the server includes: When the silent upgrade switch is turned on, the terminal device automatically downloads the second file from the server.

In an implementation, the silent upgrade switch may be used to control all first files stored in the terminal device. When the user turns on the silent upgrade switch, the mobile phone may automatically update all the stored first files.

In another implementation, the terminal device may provide a silent upgrade switch for each stored first file. When the user turns on a silent upgrade switch, the mobile phone may automatically update only a first file corresponding to the silent upgrade switch.

That is, the terminal device may support overall update of all the stored first files, or support update of a single first file.

Optionally, after the terminal device stores the first file, the method further includes: The terminal device displays a first interface. The first interface includes a first card corresponding to the first page (or the first card is associated with the first page), and the first card includes a page identifier of the first page and/or an identifier of a page type of the first page. The first operation is an operation of tapping or touching the first card in the first interface.

The terminal device displays the first card corresponding to the first page, so that the user can intuitively see a portal of the first page. The user may trigger, by tapping the first card, the terminal device to display the first page, and an operation is convenient.

Optionally, after the terminal device stores the first file, the method further includes: The terminal device displays a first interface. The first interface includes a first folder, the first folder includes at least one card, the at least one card includes a first card, the first card is associated with the first page, and the first card includes a page identifier of the first page and/or an identifier of a page type of the first page. The terminal device receives a third operation. The third operation is an operation of opening the first folder by the user. The terminal device displays a second interface in response to the third operation. The second interface includes the card in the first folder. The first operation is an operation of tapping or touching the first card in the second interface.

Optionally, page types of cards included in the first folder are the same: and the first interface further includes a second folder, the second folder includes at least one card, and a page type of the card included in the second folder is different from the page type of the card included in the first folder.

For example, the first folder may be a shopping folder, and the second folder may be a financial folder.

Optionally, the method further includes: The terminal device receives a fourth operation. The fourth operation is an operation of deleting the first card by the user. The terminal device deletes the first card and the first file in response to the fourth operation.

When the user wants to remove a first card, the user may perform the fourth operation on the first card, to trigger the terminal device to delete the first card and a corresponding first file.

Optionally, before the terminal device displays the first interface, the method further includes: The terminal device displays a third interface. The third interface includes a functional control corresponding to a start portal of the first interface, and the third interface is a leftmost screen, a home screen, or a drop-down interface. That the terminal device displays a first interface includes: The terminal device receives a fifth operation. The fifth operation is an operation of tapping, by the user, the functional control corresponding to the start portal of the first interface. The terminal device displays the first interface in response to the fifth operation.

In some embodiments, the server and the first object each further include check information of the first file. That the terminal device performs a first interaction operation with a first object, to obtain identification information that is of the first file and that is included in the first object includes: The terminal device performs the first interaction operation with the first object, to obtain the identification information of the first file and the check information of the first file that are included in the first object.

That the terminal device downloads the corresponding first file from the server based on the identification information of the first file includes: The terminal device downloads the corresponding first file and the check information of the first file from the server based on the identification information of the first file.

That the terminal device stores the first file, and displays the corresponding first page based on the first file includes: When the terminal device learns, through check, that the check information of the first file downloaded from the server is consistent with the check information that is of the first file and that is included in the first object, the terminal device stores the first file, and displays the corresponding first page based on the first file.

The check information of the first file may include a check signature, a package name, and the like of the first file.

The terminal device checks the first file by using the check information of the first file, to ensure security of the first file and avoid intrusion of the first file that is corrupted or tampered with.

Optionally, the method further includes: When the terminal device learns, through check, that the check information of the first file downloaded from the server is inconsistent with the check information that is of the first file and that is included in the first object, the terminal device displays prompt information indicating that the check on the first file fails.

In some other embodiments, the first file included in the server is an encrypted file, and the first object further includes a key of the first file. That the terminal device performs a first interaction operation with a first object, to obtain identification information that is of the first file and that is included in the first object includes: The terminal device performs the first interaction operation with the first object, to obtain the identification information of the first file and the key of the first file that are included in the first object.

That the terminal device stores the first file, and displays the corresponding first page based on the first file includes: When the terminal device is capable of decrypting the first file based on the key that is of the first file and that is included in the first object, the terminal device stores the first file, and displays the corresponding first page based on the first file.

Optionally, the terminal device includes a first module, the first module includes the at least one first file, and the first file is related to the first page. After the terminal device performs the first interaction operation with the first object, to obtain the identification information that is of the first file and that is included in the first object, the method further includes: When the first module includes the first file corresponding to the identification information of the first file, the terminal device directly starts the corresponding first file from the first module, and displays the corresponding first page based on the first file.

For example, the first module may be a Huawei mobile services core (HMS core). After the terminal device performs the first interaction operation with the NFC tag, to obtain the identification information that is of the first file and that is included in the NFC tag, the terminal device may directly start the corresponding first file from the HMS core based on the identification information of the first file, and display the corresponding first page based on the first file.

Optionally, that the terminal device downloads the corresponding first file from the server based on the identification information of the first file includes: When the first module does not include the first file corresponding to the identification information of the first file, the terminal device downloads the corresponding first file from the server based on the identification information of the first file.

Compared with the manner in which the terminal device downloads the first file from the server and makes a jump, in this embodiment, the manner in which the terminal device directly starts the first file from the HMS core and makes a jump consumes a shorter time overall and achieves higher efficiency. In addition, in the manner in which the terminal device directly starts the first file from the HMS core and makes a jump, an offline jump may be further implemented in some scenarios.

According to a second aspect, an embodiment of this application provides a page display apparatus. The page display apparatus may be applied to a terminal device. The terminal device is connected to a server. The server includes at least one first file, and the first file is related to a first page. The apparatus may be configured to implement the page display method according to the first aspect. A function of the apparatus may be implemented by hardware, or may be implemented by hardware by executing corresponding software. The hardware or software includes one or more modules or units corresponding to the function, for example, an interaction unit, a transceiver unit, a processing unit, and a display unit.

The interaction unit is configured to perform a first interaction operation with a first object, to obtain identification information that is of the first file and that is included in the first object.

The processing unit is configured to download the corresponding first file from the server through the transceiver unit based on the identification information of the first file.

The processing unit is further configured to: store the first file, and display the corresponding first page through the display unit based on the first file.

The processing unit is further configured to: receive a first operation: and display the first page again through the display unit in response to the first operation. The first operation is an operation of opening the first page by a user.

The first object may be an NFC tag, a device including an NFC tag, a two-dimensional code label, a device capable of displaying a two-dimensional code, or a first electronic device that wirelessly communicates with the terminal device.

For example, the first file may include the identification information of the first file. The identification information of the first file may be a page name, a page ID, or the like of the first page.

The first page may be a third-party page. For example, the first page may include any one of the following: a commodity purchase page, an advertisement page, a web page, a payment page, an official account page, a video display page, and an article display page.

In some embodiments, the processing unit is further configured to learn, from the server through the transceiver unit based on the identification information of the first file, whether the first file is updated. When the first file is updated, the processing unit displays an update reminder of the first file through the display unit.

Optionally, the processing unit is further configured to: receive a second operation; download a second file from the server through the transceiver unit in response to the second operation; and replace the first file with the second file. The second file is a file obtained after the first file is updated.

In some other embodiments, the processing unit is further configured to learn, from the server through the transceiver unit based on the identification information of the first file, whether the first file is updated. When the first file is updated, the processing unit automatically downloads a second file from the server through the transceiver unit; and replaces the first file with the second file. The second file is a file obtained after the first file is updated.

Optionally, the terminal device includes a silent upgrade switch. The processing unit is specifically configured to: when the silent upgrade switch is turned on, automatically download the second file from the server through the transceiver unit.

In some embodiments, the processing unit is further configured to display a first interface through the display unit. The first interface includes a first card corresponding to the first page, and the first card includes a page identifier of the first page and/or an identifier of a page type of the first page. The first operation is an operation of tapping or touching the first card in the first interface.

In some other embodiments, the processing unit is further configured to display a first interface through the display unit. The first interface includes a first folder, the first folder includes at least one card, a first card is a card in the at least one card, and the first card includes a page identifier of the first page and/or an identifier of a page type of the first page. The processing unit is further configured to: receive a third operation: and display a second interface through the display unit in response to the third operation. The second interface includes the card in the first folder. The third operation is an operation of opening the first folder by the user. The first operation is an operation of tapping or touching the first card in the second interface.

Optionally, page types of cards included in the first folder are the same: and the first interface further includes a second folder, the second folder includes at least one card, and a page type of the card included in the second folder is different from the page type of the card included in the first folder.

Optionally, the processing unit is further configured to: receive a fourth operation; and delete the first card and the first file in response to the fourth operation. The fourth operation is an operation of deleting the first card by the user.

Optionally, the processing unit is further configured to display a third interface through the display unit. The third interface includes a functional control corresponding to a start portal of the first interface, and the third interface is a leftmost screen, a home screen, or a drop-down interface. The processing unit receives a fifth operation; and displays the first interface through the display unit in response to the fifth operation. The fifth operation is an operation of tapping, by the user, the functional control corresponding to the start portal of the first interface.

In some embodiments, the server and the first object each further include check information of the first file. The interaction unit is specifically configured to perform the first interaction operation with the first object, to obtain the identification information of the first file and the check information of the first file that are included in the first object.

The processing unit is specifically configured to download the corresponding first file and the check information of the first file from the server through the transceiver unit based on the identification information of the first file. When the processing unit learns, through check, that the check information of the first file downloaded from the server is consistent with the check information that is of the first file and that is included in the first object, the processing unit stores the first file, and displays the corresponding first page through the display unit based on the first file.

The check information of the first file may include a check signature, a package name, and the like of the first file.

Optionally, when the processing unit learns, through check, that the check information of the first file downloaded from the server is inconsistent with the check information that is of the first file and that is included in the first object, the processing unit displays, through the display unit, prompt information indicating that the check on the first file fails.

In some other embodiments, the first file included in the server is an encrypted file, and the first object further includes a key of the first file. The interaction unit is specifically configured to perform the first interaction operation with the first object, to obtain the identification information of the first file and the key of the first file that are included in the first object.

When the processing unit is capable of decrypting the first file based on the key that is of the first file and that is included in the first object, the processing unit stores the first file, and displays the corresponding first page through the display unit based on the first file.

Optionally, the terminal device includes a first module, the first module includes the at least one first file, and the first file is related to the first page. The processing unit is further configured to: when the first module includes the first file corresponding to the identification information of the first file, directly start the corresponding first file from the first module, and display the corresponding first page through the display unit based on the first file.

For example, the first module may be a Huawei mobile services core (HMS core).

Optionally, the processing unit is specifically configured to: when the first module does not include the first file corresponding to the identification information of the first file, download the corresponding first file from the server through the transceiver unit based on the identification information of the first file.

It may be understood that all functions corresponding to the page display method according to the first aspect may be implemented by using the page display apparatus. Details are not described herein.

According to a third aspect, an embodiment of this application provides an electronic device, including a processor, a memory, and a computer program. The computer program is stored in the memory. When the computer program is executed by the processor, the electronic device is enabled to implement the page display method according to the first aspect.

The electronic device may be a mobile phone, a tablet computer, a wearable device (for example, a smartwatch or a smart band), a vehicle-mounted device, an augmented reality (AR)/virtual reality (VR) device, a notebook computer, an ultra-mobile personal computer (UMPC), a netbook, a personal digital assistant (PDA), or the like.

According to a fourth aspect, an embodiment of this application provides a computer-readable storage medium. The computer-readable storage medium includes a computer program. When the computer program runs on an electronic device, the electronic device is enabled to implement the page display method according to the first aspect.

According to a fifth aspect, an embodiment of this application further provides a computer program product, including computer-readable code. When the computer-readable code run on an electronic device, the electronic device is enabled to implement the page display method according to the first aspect.

According to a sixth aspect, an embodiment of this application further provides a page display system, including a terminal device, a server, and a first object. The terminal device is connected to the server. The server includes at least one first file, and the first file is related to a first page. The first object is an NFC tag, a device including an NFC tag, a two-dimensional code label, a device capable of displaying a two-dimensional code, or a first electronic device that wirelessly communicates with the terminal device.

When the terminal device performs a first interaction operation with the first object,
    the terminal device obtains identification information that is of the first file and that is included in the first object;
    the terminal device downloads the corresponding first file from the server based on the identification information of the first file;
    the terminal device stores the first file, and displays the corresponding first page based on the first file;

the terminal device receives a first operation, where the first operation is an operation of opening the first page by a user; and the terminal device displays the first page again in response to the first operation.

Optionally, the terminal device is further configured to: learn, from the server based on the identification information of the first file, whether the first file is updated: and when the first file is updated, display an update reminder of the first file.

Optionally, the terminal device is further configured to: receive a second operation; download a second file from the server in response to the second operation, where the second file is a file obtained after the first file is updated, and replace the first file with the second file.

Optionally, the terminal device is further configured to display a first interface, where the first interface includes a first card, the first card is associated with the first page, and the first card includes a page identifier of the first page and/or an identifier of a page type of the first page. The first operation is an operation of tapping or touching the first card in the first interface.

Optionally, the terminal device is further configured to: receive a fourth operation, where the fourth operation is an operation of deleting the first card by the user: and delete the first card and the first file in response to the fourth operation.

Optionally, the terminal device is further configured to display a third interface, where the third interface includes a functional control corresponding to a start portal of the first interface, and the third interface is a leftmost screen, a home screen, or a drop-down interface; and the terminal device is specifically configured to: receive a fifth operation, where the fifth operation is an operation of tapping, by the user, the functional control corresponding to the start portal of the first interface: and display the first interface in response to the fifth operation.

It may be understood that in the page display system, the terminal device may implement all functions of the page display method according to the first aspect. Details are not described herein.

According to a seventh aspect, an embodiment of this application further provides an NFC tag. The NFC tag includes at least identification information of a first file, and the first file is related to a first page.

According to an eighth aspect, an embodiment of this application further provides a server. The server includes at least one first file, and the first file is related to a first page. The first file includes identification information of the first file.

For example, the identification information of the first file may be a page name, a page ID, or the like of the first page. The first page may be a third-party page. For example, the first page may include any one of the following: a commodity purchase page, an advertisement page, a web page, a payment page, an official account page, a video display page, and an article display page.

For beneficial effects of the second aspect to the eighth aspect, refer to the descriptions in the first aspect. Details are not described herein.

It should be understood that descriptions of technical features, technical solutions, beneficial effect, or similar words in this application do not imply that all features and advantages can be implemented in any individual embodiment. On the contrary, it may be understood that the descriptions of the features or the beneficial effects mean that at least one embodiment includes a specific technical feature, technical solution, or beneficial effect. Therefore, the descriptions of the technical features, the technical solutions, or the beneficial effects in this specification may not necessarily be specific to a same embodiment. Further, the technical features, the technical solutions, and the beneficial effects described in embodiments may be combined in any proper manner. A person skilled in the art may understand that an embodiment may be implemented without one or more specific technical features or technical solutions, or beneficial effects in the specific embodiment. In other embodiments, additional technical features and beneficial effects may be identified in a specific embodiment that does not reflect all embodiments.

DESCRIPTION OF EMBODIMENTS

Figure 1:
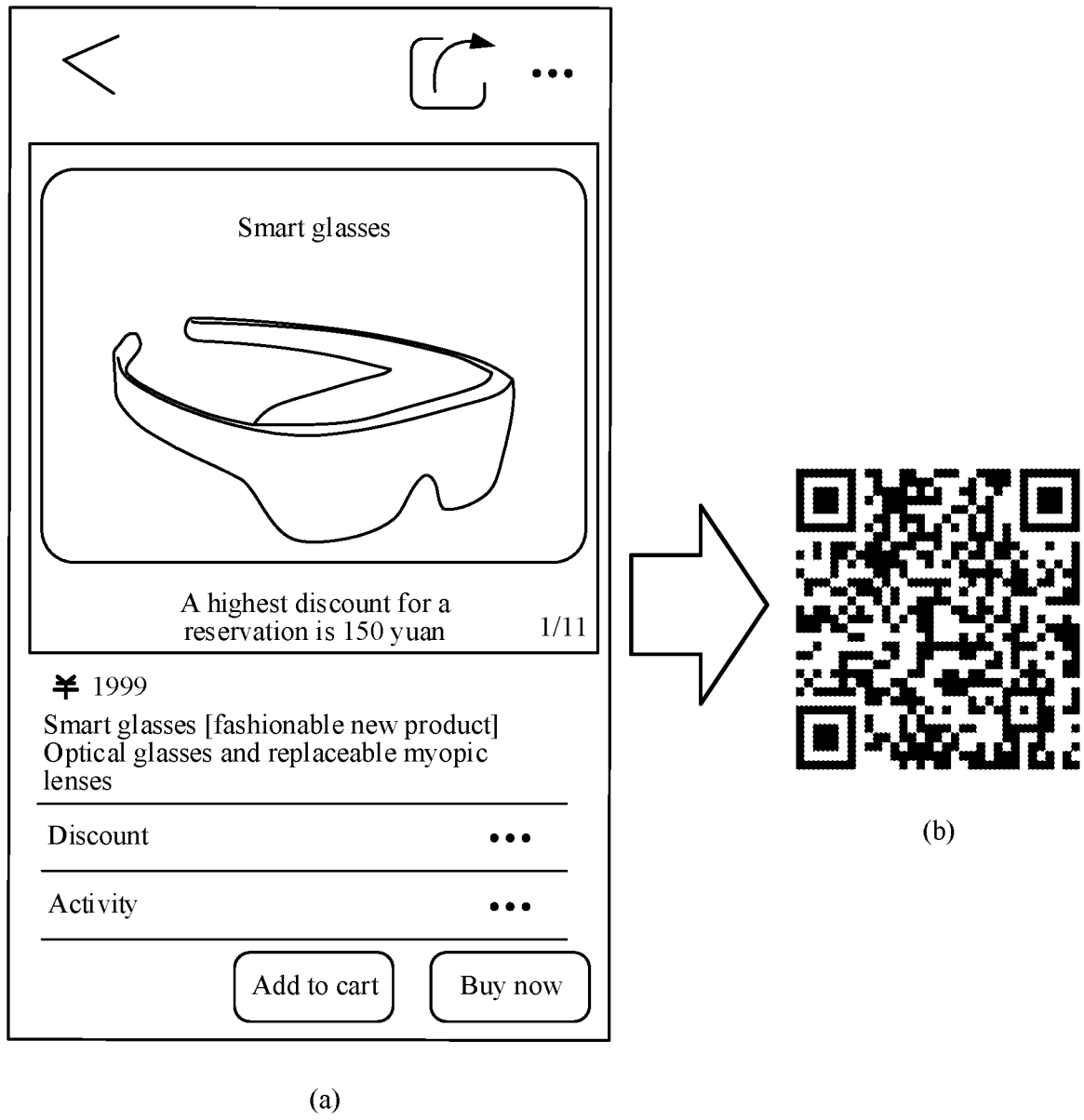
FIG. 1 is a schematic diagram of a commodity purchase page of smart glasses and a two-dimensional code corresponding to the commodity purchase page.

Terms used in the following embodiments are merely intended to describe specific embodiments, but are not intended to limit this application. The terms "one", "a", "the", and "this" of singular forms used in this specification and the appended claims of this application are also intended to include expressions such as "one or more", unless otherwise specified in the context clearly. It should be further understood that in the following embodiments of this application, "at least one" and "one or more" mean one or at least two (including two). The term "and/or" is used to describe an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different locations in this specification do not necessarily mean referring to a same embodiment, but mean "one or more but not all of embodiments", unless otherwise specifically emphasized in another manner. The terms "include", "comprise", "have", and variants thereof all mean "include but is not limited to", unless otherwise specifically emphasized in another manner. The term "connection" includes a direct connection and an indirect connection, unless otherwise specified.

The terms "first" and "second" described below are merely intended for a purpose of description, and shall not be understood as an indication or implication of relative importance or an implicit indication of a quantity of indicated technical features. Therefore, a feature limited by "first" or "second" may explicitly or implicitly include one or more features.

In embodiments of this application, the word such as "example" or "for example" is used to represent giving an example, an illustration, or a description. Any embodiment or design solution described as an "example" or "for example" in embodiments of this application should not be explained as being more preferred or having more advantages than another embodiment or design solution. Exactly, use of the word such as "example" or "for example" is intended to present a related concept in a specific manner.

Embodiments of this application are applicable to a scenario in which a user views a third-party page by using a terminal device. The third page may also be referred to as a first page.

The terminal device may include a mobile phone, a tablet computer, a wearable device (for example, a smartwatch or a smart band), a vehicle-mounted device, an augmented reality (AR)/virtual reality (VR) device, a notebook computer, an ultra-mobile personal computer (UMPC), a netbook, a personal digital assistant (PDA), or the like. A specific type of the terminal device is not limited in embodiments of this application.

For example, the third-party page may include a commodity purchase page, an advertisement page, a web page, a payment page (or referred to as a payment page) used for making a payment to a collection account of a merchant, an official account page, a video (or short video) display page, or an article display page. A specific type of the third-party page is not limited in embodiments of this application either.

For example, in an implementation scenario, the terminal device may be a mobile phone, and the third-party page may be a commodity purchase page. The commodity purchase page may include commodity purchase information such as a commodity picture and a commodity price. The user may use the mobile phone to view the commodity purchase page, and perform an access operation such as viewing the commodity picture and the commodity price or purchasing a commodity on the commodity purchase page.

Currently, a mainstream manner in which the terminal device displays the third-party page to the user is as follows: The terminal device scans a two-dimensional code corresponding to the third-party page, obtains a link of the third-party page included in the two-dimensional code, and then obtains the third-party page based on the link of the third-party page and displays the third-party page.

For example, the link of the third-party page may be a uniform resource locator (URL) address of the third-party page.

For example, the third-party page is a commodity purchase page of smart glasses. FIG. 1 is a schematic diagram of a commodity purchase page of smart glasses and a two-dimensional code corresponding to the commodity purchase page. As shown in FIG. 1, when a third-party merchant (which is referred to as a merchant below) needs to provide the user with the commodity purchase page of smart glasses shown in (a) in FIG. 1, the merchant may write a URL address of the commodity purchase page of smart glasses shown in (a) in FIG. 1 into a two-dimensional code shown in (b) in FIG. 1, and display the two-dimensional code to the user. For example, the two-dimensional code may be displayed by using a two-dimensional code label. The two-dimensional code label refers to a paper carrier or a non-paper carrier on which the two-dimensional code is printed.

For example, the merchant may enter the URL address of the commodity purchase page of smart glasses shown in (a) in FIG. 1 into a two-dimensional code generator. The two-dimensional code generator may generate, based on the URL address of the commodity purchase page of smart glasses shown in (a) in FIG. 1, the two-dimensional code shown in (b) in FIG. 1, so that the URL address of the commodity purchase page of smart glasses can be written into the two-dimensional code. The two-dimensional code generator may be software specifically configured to generate a corresponding two-dimensional code based on entered information.

Figure 2:
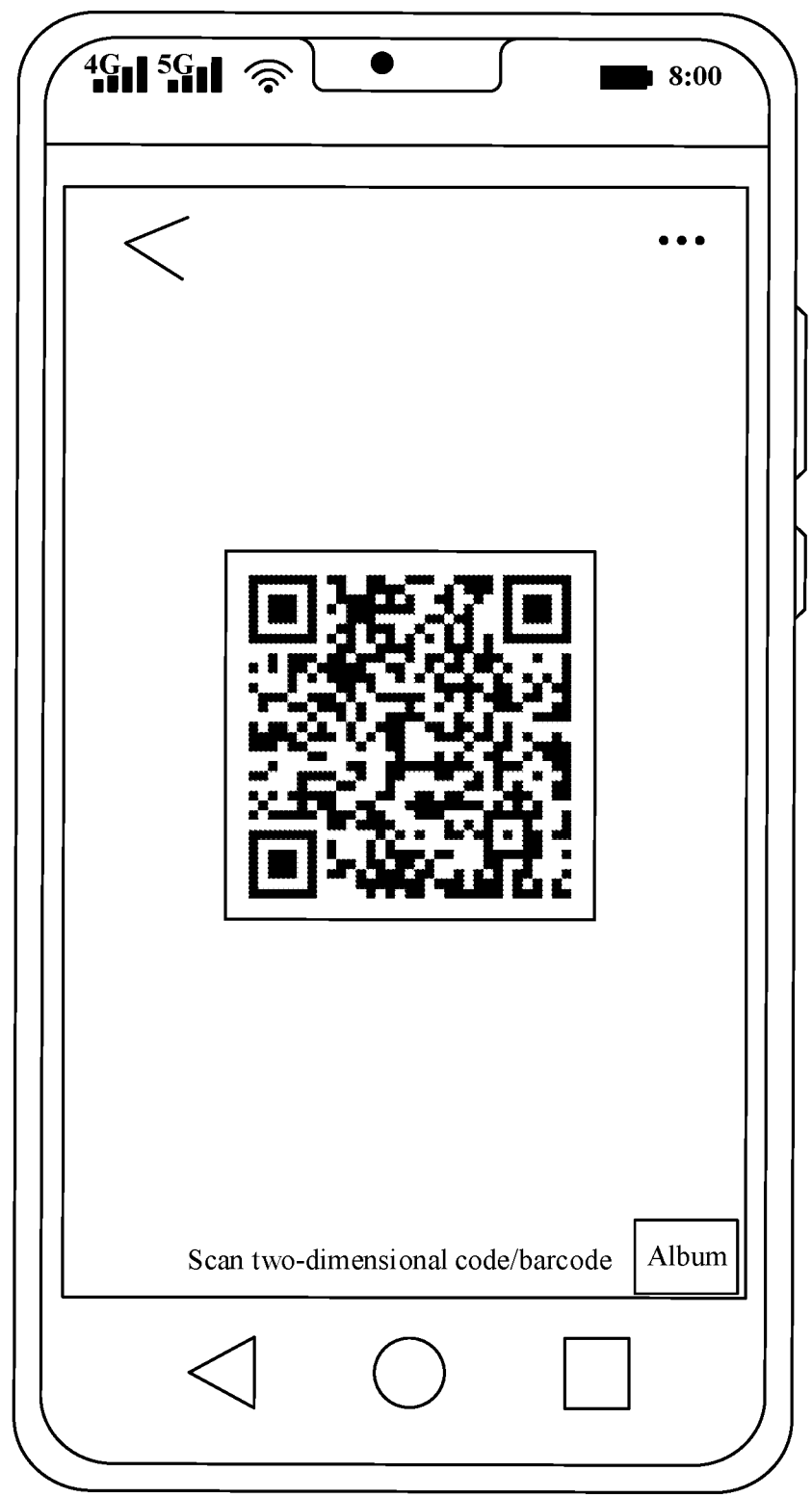
FIG. 2 is a schematic diagram of a scenario in which a mobile phone scans a two-dimensional code shown in (b) in FIG. 1.

FIG. 2 is a schematic diagram of a scenario in which the mobile phone scans the two-dimensional code shown in (b) in FIG. 1. As shown in FIG. 2, after the two-dimensional code shown in (b) in FIG. 1 is displayed to the user, the user may use the mobile phone to scan the two-dimensional code shown in (b) in FIG. 1. The mobile phone may obtain, by parsing the two-dimensional code shown in (b) in FIG. 1, the URL address of the commodity purchase page of smart glasses shown in (a) in FIG. 1.

Figure 3:
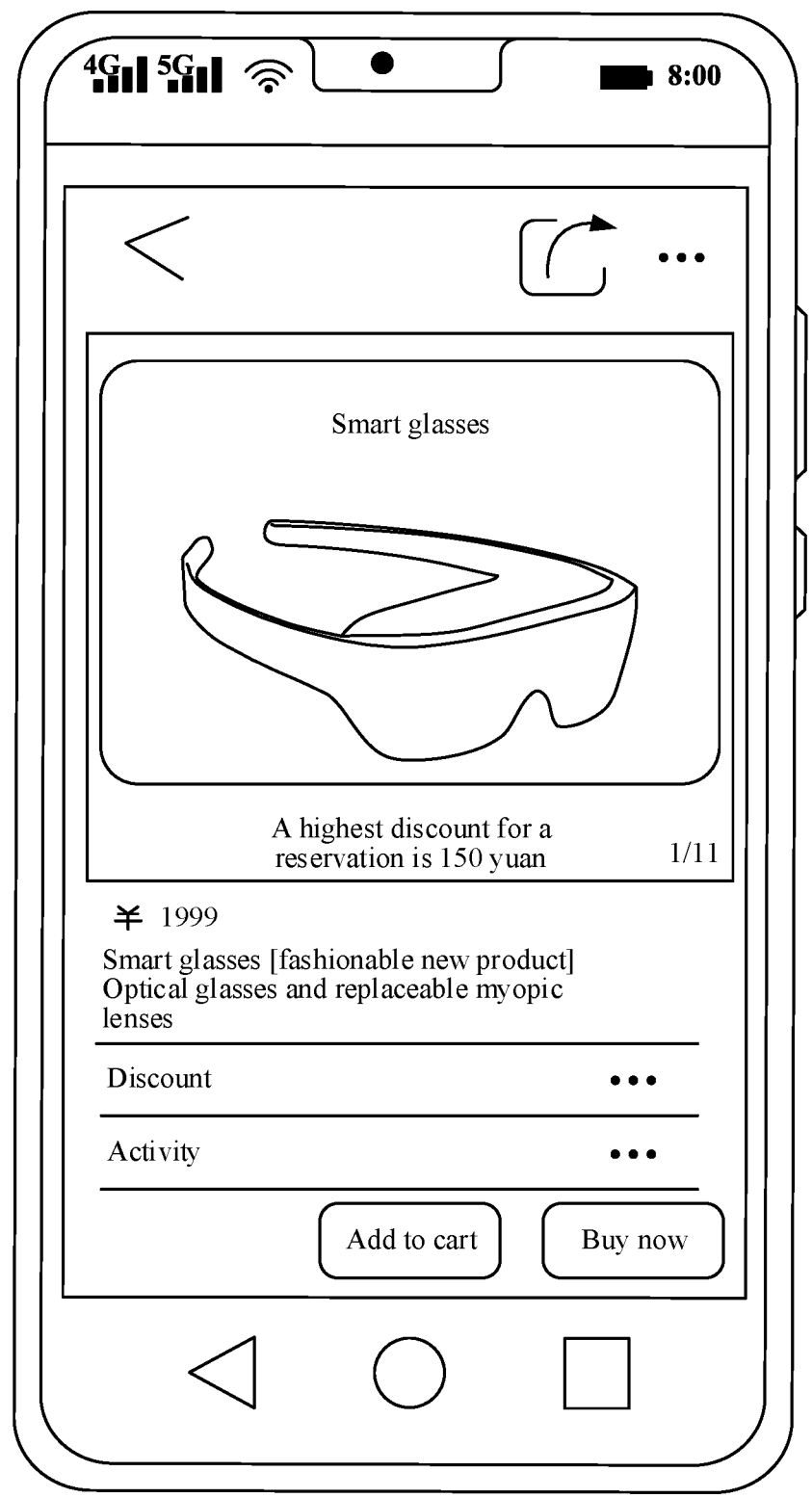
FIG. 3 is a schematic diagram in which a mobile phone displays a commodity purchase page of smart glasses shown in (a) in FIG. 1.

FIG. 3 is a schematic diagram in which the mobile phone displays the commodity purchase page of smart glasses shown in (a) in FIG. 1. As shown in FIG. 3, after obtaining the URL address of the commodity purchase page of smart glasses shown in (a) in FIG. 1, the mobile phone may obtain, based on the URL address of the commodity purchase page of smart glasses shown in (a) in FIG. 1, the commodity purchase page of smart glasses shown in (a) in FIG. 1, and display the commodity purchase page. The user may perform an access operation such as viewing a price, an appearance, and a discount activity of smart glasses on the commodity purchase page of smart glasses shown in FIG. 3.

Optionally, a function of scanning the two-dimensional code by the mobile phone may be implemented based on an application (App) that is installed in the mobile phone and that has a code scanning function. The application is briefly referred to as an app below. For example, the application having the code scanning function may include a browser, a camera application, another chat application, or a payment application.

However, in the foregoing manner in which the terminal device displays the third-party page, a process in which the terminal device scans the two-dimensional code corresponding to the third-party page is non-reproducible. When the user wants to view the third-party page again, the user needs to use the terminal device to rescan the two-dimensional code corresponding to the third-party page.

For example, after the user uses the mobile phone to scan the two-dimensional code shown in (b) in FIG. 1, and views the commodity purchase page of smart glasses shown in (a) in FIG. 1, when the user wants to view again the commodity purchase page of smart glasses shown in (a) in FIG. 1, the user needs to use the mobile phone to rescan the two-dimensional code shown in (b) in FIG. 1. If the two-dimensional code shown in (b) in FIG. 1 does not exist on site, the user possibly cannot use the mobile phone to view again the commodity purchase page of smart glasses shown in (a) in FIG. 1.

In addition, in the foregoing manner in which the terminal device displays the third-party page, the link of the third-party page included in the two-dimensional code does not have time validity. After a provider of the third-party page updates the third-party page, the link of the third-party page may change. However, the generated two-dimensional code corresponding to the third-party page before the update does not change. When the user uses the terminal device to scan the two-dimensional code corresponding to the third-party page before the update, an updated third-party page possibly cannot be viewed, or even the two-dimensional code may be invalid.

For example, when the merchant updates the commodity purchase page of smart glasses shown in (a) in FIG. 1 (for example, updates a commodity price or a commodity model), a link of the commodity purchase page of smart glasses shown in (a) in FIG. 1 may be updated accordingly. However, the two-dimensional code shown in (b) in FIG. 1 still includes the link of the commodity purchase page of smart glasses before the update. In this case, when the user uses the mobile phone to scan the two-dimensional code shown in (b) in FIG. 1, the user cannot view an updated commodity purchase page of smart glasses. Usually, the merchant needs to provide the user again with a two-dimensional code corresponding to the updated commodity purchase page of smart glasses.

In this background, embodiments of this application provide a page display method. In the method, a provider (for example, the foregoing third-party merchant) of a third-party page may package the third-party page into a first file, and upload the first file to a first platform connected to a terminal device. The first file may include identification information of the first file. The identification information of the first file may be a page name, a page ID, or the like of the third page. In addition, the provider of the third-party page may further write the identification information of the first file into a first object. The method may include: The terminal device performs a first interaction operation with the first object, to obtain the identification information that is of the first file and that is included in the first object. The terminal device downloads the first file from the first platform based on the identification information of the first file. The terminal device caches (that is, stores) the first file, and displays the third-party page based on the first file.

The terminal device caches the first file. Therefore, when a user needs to view the third-party page again, the user may perform, on the terminal device, an operation of opening the third-party page. The terminal device may display the third-party page again based on the first file in response to the operation of opening the third-party page by the user, to reproduce the third-party page. The operation of opening the third-party page by the user may also be referred to as a first operation.

The first file is related to the third-party page, and may be specifically a file package including content of the third-party page. The file package may be in a plurality of formats. When downloading the first file from the first platform, the terminal device may download the first file in a format that is adapted to an operating system of the terminal device from the first platform based on the operating system of the terminal device.

For example, the format of the first file may include an APK format, an IPA format, a PXL format, a DEB format, a DMG format, or an EXE format. The operating system of the terminal device may be a Harmony™ system, an Android™ system, an iOS™ system, a Mac™ system, a Windows™ system, or the like. When the operating system of the terminal device is the Harmony™ system or the Android™ system, the terminal device may download the first file in the APK format from the first platform. When the operating system of the terminal device is the iOS™ system, the terminal device may download the first file in the IPA format, the PXL format, or the DEB format from the first platform. When the operating system of the terminal device is the Mac™ system, the terminal device may download the first file in the DMG format from the first platform. When the operating system of the terminal device is the Windows™ system, the terminal device may download the first file in the EXE format from the first platform.

It should be noted that the format of the first file and a specific type of the operating system of the terminal device are not limited in this application. In addition, an adaptation relationship between the operating system of the terminal device and the format of the first file is not limited in this application either. For example, the Harmony™ system may also be adapted to other non-APK formats.

Optionally, in embodiments of this application, the first object may be a near field communication (NFC) tag, a device including an NFC tag (or into which an NFC tag is embedded), a two-dimensional code label, a device capable of displaying a two-dimensional code (for example, an electronic device including a display, such as a mobile phone or a computer, where the two-dimensional code may be displayed on the display of the electronic device), a first electronic device that wirelessly communicates with the terminal device, or the like. For example, the first electronic device may be a mobile phone, a smart screen, a computer, or a band. The first electronic device may wirelessly communicate with the terminal device by using a wireless fidelity (Wi-Fi) network, Bluetooth (BT), a ZigBee network, or the like.

When the first object is an NFC tag or a device into which an NFC tag is embedded, that the terminal device performs a first interaction operation with the first object, to obtain the identification information that is of the first file and that is included in the first object may mean that the terminal device touches (or approaches) the NFC tag or the device into which an NFC tag is embedded, to obtain the identification information that is of the first file and that is included in the NFC tag or the device into which an NFC tag is embedded. It may be understood that the terminal device also has an NFC tag, for example, an NFC chip.

When the first object is a two-dimensional code label or a device capable of displaying a two-dimensional code, that the terminal device performs a first interaction operation with the first object, to obtain the identification information that is of the first file and that is included in the first object may mean that the terminal device scans the two-dimensional code label or a two-dimensional code displayed on the device capable of displaying a two-dimensional code, to obtain the identification information that is of the first file and that is included in the two-dimensional code.

Similarly, when the first object is a first electronic device that wirelessly communicates with the terminal device by using a Wi-Fi network, Bluetooth, a ZigBee network, or the like, that the terminal device performs a first interaction operation with the first object, to obtain the identification information that is of the first file and that is included in the first object may mean that the terminal device wirelessly communicates with the first electronic device, to obtain the identification information that is of the first file and that is included in the first electronic device. For example, when the terminal device establishes a connection to the first electronic device, the terminal device may obtain the identification information of the first file from the first electronic device, or the first electronic device may actively send the identification information of the first file to the terminal device. This is not limited herein.

A specific form of the first object and a specific implementation of the first interaction operation are not limited in this application.

Optionally, in embodiments of this application, the first platform may be a server, or a cloud platform including a server or a server cluster, and the cloud platform may be connected to the terminal device by using a network.

Figure 4:
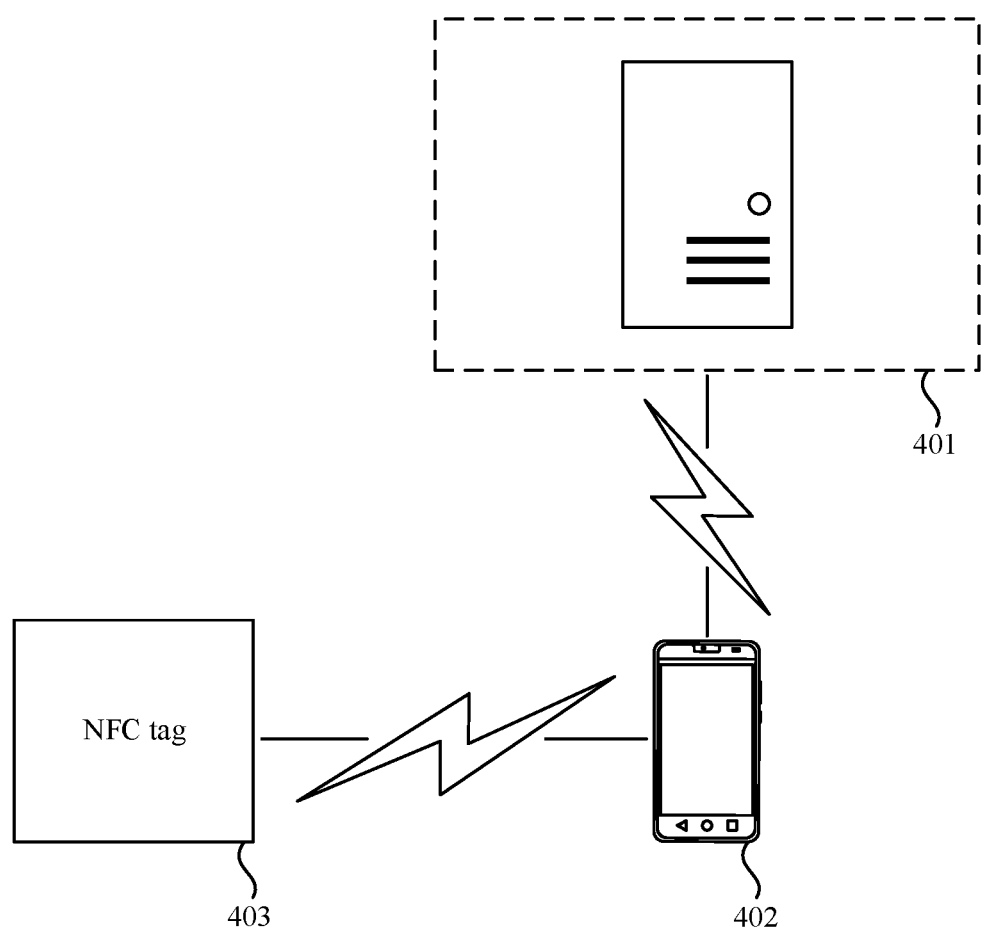
FIG. 4 is a schematic diagram of an application scenario according to an embodiment of this application.

For example, FIG. 4 is a schematic diagram of an application scenario according to an embodiment of this application. As shown in FIG. 4, in a possible application scenario, the first platform may be a server 401, the terminal device may be a mobile phone 402, and the first object may be an NFC tag 403. The server 401 is connected/communicatively connected to the mobile phone 402 by using a network. An NFC chip is disposed in the mobile phone 402, and the mobile phone 402 may implement NFC communication with the NFC tag 403 based on the NFC chip disposed in the mobile phone 402.

When the page display method provided in embodiments of this application is applied to the scenario shown in FIG. 4, a specific implementation process of the page display method may include: A provider of a third-party page packages the third-party page into a first file, and uploads the first file to the server 401. In addition, the provider of the third-party page writes identification information of the first file into the NFC tag 403. The mobile phone 402 performs a first interaction operation with the NFC tag 403, to obtain the identification information that is of the first file and that is included in the NFC tag 403. After the mobile phone 402 obtains the identification information that is of the first file and that is included in the NFC tag 403, the mobile phone 402 may download the first file from the server 401 based on the identification information of the first file. Then, the mobile phone 402 may cache the first file, and display the third-party page based on the first file.

The mobile phone 402 caches the first file. Therefore, when a user needs to view the third-party page again, the user may perform, on the mobile phone 402, an operation of opening the third-party page. The mobile phone 402 may display the third-party page again based on the first file in response to the operation of opening the third-party page by the user, to reproduce the third-party page.

It should be noted that specific forms of the first object, the first platform, and the terminal device are not limited in this application.

Optionally, in embodiments of this application, a function of downloading, by the terminal device, the first file from the first platform based on the identification information of the first file and a function of caching the first file and displaying the third-party page based on the first file may be implemented by deploying an application (for example, a first application) at an application layer of the terminal device, or implemented by deploying a service (for example, a first service) at a system layer of the terminal device. The first application may provide a transparent page activity component (activity), and the transparent page activity may be triggered only when being used. For example, when the terminal device touches the NFC tag, the terminal device may be triggered to display the transparent page activity. The first service may run in a system background of the mobile phone, and may have no corresponding interface for display.

For example, the first application is deployed on the terminal device. In this case, the terminal device may download the first file from the first platform based on the identification information of the first file by using the first application. Then, the terminal device may cache the first file by using the first application, and display the third-party page based on the first file. When the user needs to view the third-party page again, the user may perform, in the first application, an operation of opening the third-party page, to trigger the terminal device to display the third-party page again based on the first file by using the first application.

For example, the first application may be a virtual application (virtual App) or a local application. A type of the first application is not limited in this application.

The following describes a specific implementation process of embodiments of this application by using an example in which the terminal device is a mobile phone, the first application is a virtual app, and the first object is an NFC tag.

Figure 5:
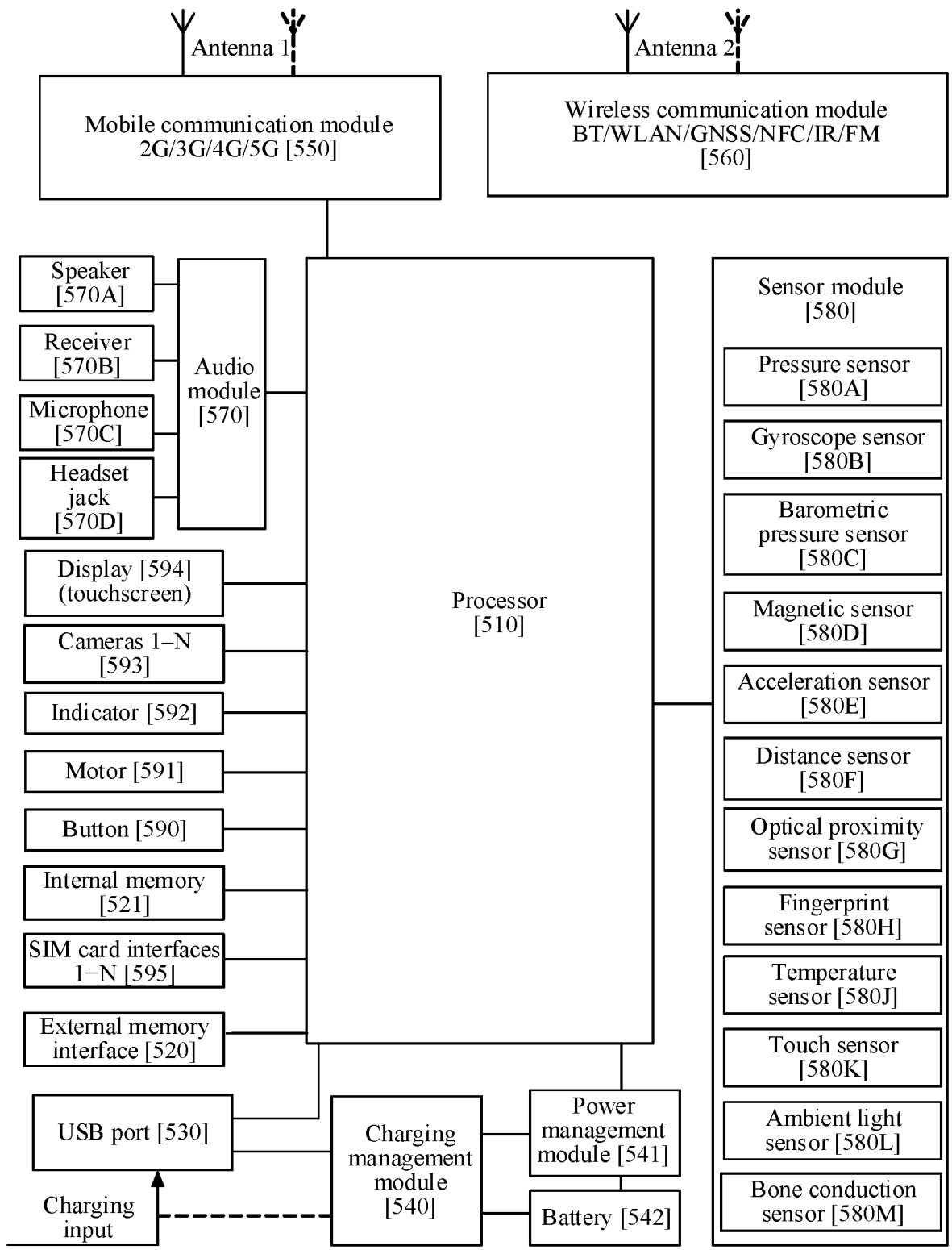
FIG. 5 is a schematic diagram of a structure of a terminal device according to an embodiment of this application.

For example, the terminal device is a mobile phone. FIG. 5 is a schematic diagram of a structure of a terminal device according to an embodiment of this application. As shown in FIG. 5, the mobile phone may include a processor 510, an external memory interface 520, an internal memory 521, a universal serial bus (USB) port 530, a charging management module 540, a power management module 541, a battery 542, an antenna 1, an antenna 2, a mobile communication module 550, a wireless communication module 560, an audio module 570, a speaker 570A, a receiver 570B, a microphone 570C, a headset jack 570D, a sensor module 580, and a button 590, a motor 591, an indicator 592, a camera 593, a display 594, a subscriber identification module (SIM) card interface 595, and the like.

The processor 510 may include one or more processing units. For example, the processor 510 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the mobile phone. The controller may generate an operation control signal based on an instruction operation code and a time sequence signal, to complete control of instruction reading and instruction execution.

A memory may be further disposed in the processor 510, and is configured to store instructions and data. In some embodiments, the memory in the processor 510 is a cache. The memory may store instructions or data just used or cyclically used by the processor 510. If the processor 510 needs to use the instructions or the data again, the processor 510 may directly invoke the instructions or the data from the memory. This avoids repeated access and reduces a waiting time of the processor 510, thereby improving system efficiency.

In some embodiments, the processor 510 may include one or more interfaces. The interface may include an inter-integrated circuit (I2C) interface, an inter-integrated circuit sound (12S) interface, a pulse code modulation (PCM) interface, a universal asynchronous receiver/transmitter (UART) interface, a mobile industry processor interface (MIPI), a general-purpose input/output (GPIO) interface, a SIM interface, a USB port, and/or the like.

The external memory interface 520 may be configured to be connected to an external memory card, for example, a micro SD card, to extend a storage capability of the mobile phone. The external storage card communicates with the processor 510 through the external memory interface 520, to implement a data storage function. For example, files such as music and videos are stored in the external storage card.

The internal memory 521 may be configured to store computer-executable program code, and the executable program code includes instructions. The processor 510 runs the instructions stored in the internal memory 521, to perform various functional applications and data processing of the mobile phone.

The internal memory 521 may further include a program storage area and a data storage area. The program storage area may store an operating system, an application (for example, the first application in embodiments of this application) required by at least one function, and the like. The data storage area may store data (for example, image data and an address book) created in a process of using the mobile phone. In addition, the internal memory 521 may include a high-speed random access memory, and may further include a nonvolatile memory, for example, at least one magnetic disk storage device, a flash memory, and a universal flash storage (UFS). The processor 510 may run the first application, so that the mobile phone implements a function of downloading a first file from a first platform based on identification information of the first file and a function of caching the first file and displaying a third-party page based on the first file.

The charging management module 540 is configured to receive a charging input from a charger. When charging the battery 542, the charging management module 540 may further supply power to the mobile phone by using the power management module 541. The power management module 541 is configured to be connected to the battery 542, the charging management module 540, and the processor 510. The power management module 541 may further receive an input from the battery 542, to supply power to the mobile phone.

A wireless communication function of the mobile phone may be implemented by using the antenna 1, the antenna 2, the mobile communication module 550, the wireless communication module 560, the modem processor, the baseband processor, and the like. The antenna 1 and the antenna 2 are configured to transmit and receive an electromagnetic wave signal. Each antenna in the mobile phone may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch. In this embodiment of this application, the wireless communication module 560 in the mobile phone may further include an NFC chip. The mobile phone may communicate with an NFC tag (a first object) by using the NFC chip, to obtain the identification information that is of the first file and that is included in the NFC tag. The mobile phone may further send, based on the wireless communication function, a request for downloading the first file to the first platform based on the identification information of the first file, and receive the first file from the first platform.

The mobile phone may implement an audio function, for example, music playing and recording, by using the audio module 570, the speaker 570A, the receiver 570B, the microphone 570C, the headset jack 570D, the application processor, and the like.

The sensor module 580 may include a pressure sensor 580A, a gyroscope sensor 580B, a barometric pressure sensor 580C, a magnetic sensor 580D, an acceleration sensor 580E, a distance sensor 580F, an optical proximity sensor 580G, a fingerprint sensor 580H, a temperature sensor 580J, a touch sensor 580K, an ambient light sensor 580L, a bone conduction sensor 580M, and the like.

The display 594 is configured to display an image, a video, and the like. The display 594 includes a display panel.

The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the mobile phone may include one or N displays 594, where N is a positive integer greater than 1. For example, the display 594 may be configured to display an application interface of the first application, and the application interface of the first application may include the third-party page. Alternatively, the display 594 may directly display the third-party page or the like.

The mobile phone implements a display function by using the GPU, the display 594, the application processor, and the like. The GPU is a microprocessor for image processing, and is connected to the display 594 and the application processor. The GPU is configured to: perform mathematical and geometric computation, and render an image. The processor 510 may include one or more GPUs that execute program instructions to generate or change display information.

It may be understood that the structure shown in FIG. 5 does not constitute a specific limitation on the mobile phone. In some embodiments, the mobile phone may include more or fewer components than those shown in FIG. 5, some components may be combined, some components may be split, or different component arrangements may be used. Alternatively, some components shown in FIG. 5 may be implemented by hardware, software, or a combination of software and hardware.

In addition, when the terminal device is a mobile terminal such as another tablet computer, a wearable device, a vehicle-mounted device, an AR/VR device, a notebook computer, a UMPC, a netbook, or a PDA, for a specific structure of the another terminal device, refer to FIG. 5. For example, components may be added to or removed from the another terminal device based on the structure shown in FIG. 5. Details are not described herein.

Figure 6:
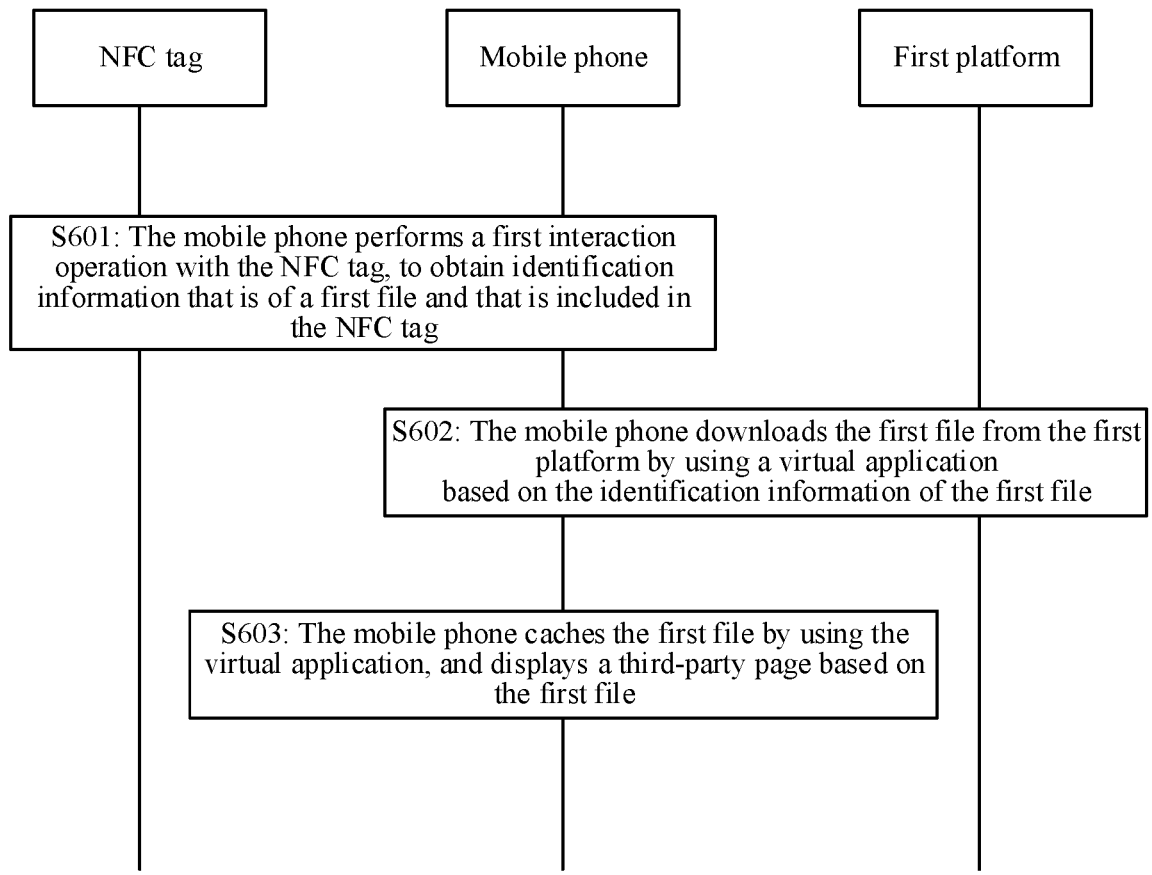
FIG. 6 is a schematic flowchart of a page display method according to an embodiment of this application.

For example, FIG. 6 is a schematic flowchart of a page display method according to an embodiment of this application. As shown in FIG. 6, the method may include S601 to S603.

S601: A mobile phone performs a first interaction operation with an NFC tag, to obtain identification information that is of a first file and that is included in the NFC tag.

As described above, that a mobile phone performs a first interaction operation with an NFC tag may mean that the mobile phone touches the NFC tag. For example, a user may hold the mobile phone to touch the NFC tag.

It may be understood that before S601 is performed, a provider of a third-party page needs to make the third-party page into the first file in advance, upload the first file to a first platform, and write the identification information of the first file into the NFC tag. Therefore, the mobile phone can obtain the identification information that is of the first file and that is included in the NFC tag only when the mobile phone performs the first interaction operation with the NFC tag.

For example, for a mobile phone side, a specific implementation of the first platform may be an application market that can provide an application downloading function for the mobile phone (that is, the foregoing server may be a database server of the application market).

Figure 7:
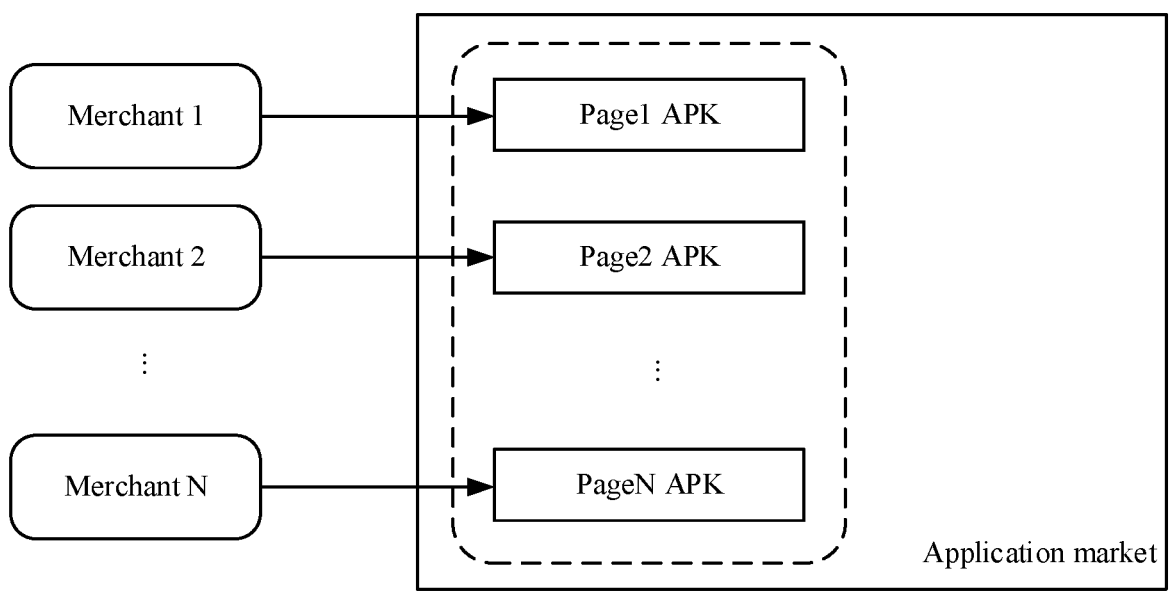
FIG. 7 is a schematic diagram of uploading a first file to an application market according to an embodiment of this application.

For example, an operating system of the mobile phone is an Android™ system, a format of the first file is an APK format, and the first platform is an application market. FIG. 7 is a schematic diagram of uploading the first file to the application market according to an embodiment of this application. As shown in FIG. 7, the provider of the third-party page may include a merchant 1, a merchant 2, . . . , and a merchant N (N is an integer greater than 0). A third-party page that may be provided by the merchant 1 is a page1, a first file made by the merchant 1 based on page1 may be a page1 APK, the merchant 1 may upload the page1 APK to the application market, and the page1 APK includes information such as a page name (for example, page1) and a page ID of the page1 APK. A third-party page that may be provided by the merchant 2 is page2, a first file made by the merchant 2 based on page2 may be a page2 APK, the merchant 2 may upload the page2 APK to the application market, and the page2 APK includes information such as a page name (for example, page2) and a page ID of the page2 APK. By analogy; a third-party page that may be provided by the merchant N is pageN, a first file made by the merchant N based on pageN may be a pageN APK, the merchant N may upload the pageN APK to the application market, and the pageN APK includes information such as a page name (for example, pageN) and a page ID of the pageN APK. That is, each provider of the third-party page may make a page provided by the provider of the third-party page into a corresponding page APK, and upload the page APK to the application market.

Figure 8:
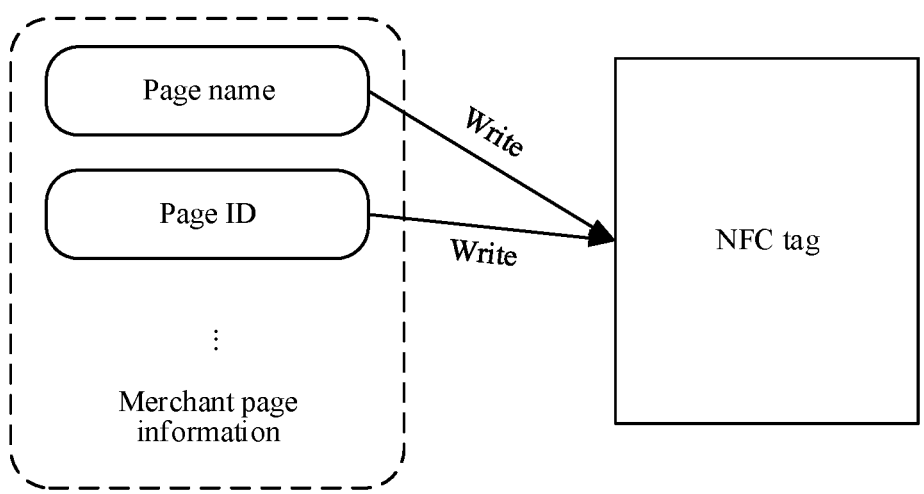
FIG. 8 is a schematic diagram of writing identification information of a first file into an NFC tag according to an embodiment of this application.

FIG. 8 is a schematic diagram of writing the identification information of the first file into the NFC tag according to an embodiment of this application. As shown in FIG. 8, when uploading, to the application market, the page APK corresponding to the page provided by each provider of the third-party page shown in FIG. 7, the provider of the third-party page may further write information such as a page name and a page ID of the page APK into the NFC tag.

Information such as the page name and the page ID is identification information of the page APK.

It should be noted that for different page APKs such as the page1 APK, the page2 APK, . . . , and the pageN APK shown in FIG. 7, identification information of the different page APKs is different. For example, identification information of the page1 APK is page1, and identification information of the page2 APK is page2.

For example, the NFC tag may be in a one-to-one correspondence with the page APK. For example, each merchant may provide an NFC tag for the user, and identification information of a page APK corresponding to a page provided by the merchant is written into the NFC tag. When the mobile phone touches an NFC tag provided by a merchant, the mobile phone may obtain identification information of a page APK included in the NFC tag.

After obtaining the identification information that is of the first file and that is included in the NFC tag, the mobile phone may perform S602.

S602: The mobile phone downloads the first file from the first platform by using a virtual app based on the identification information of the first file.

Figure 9:
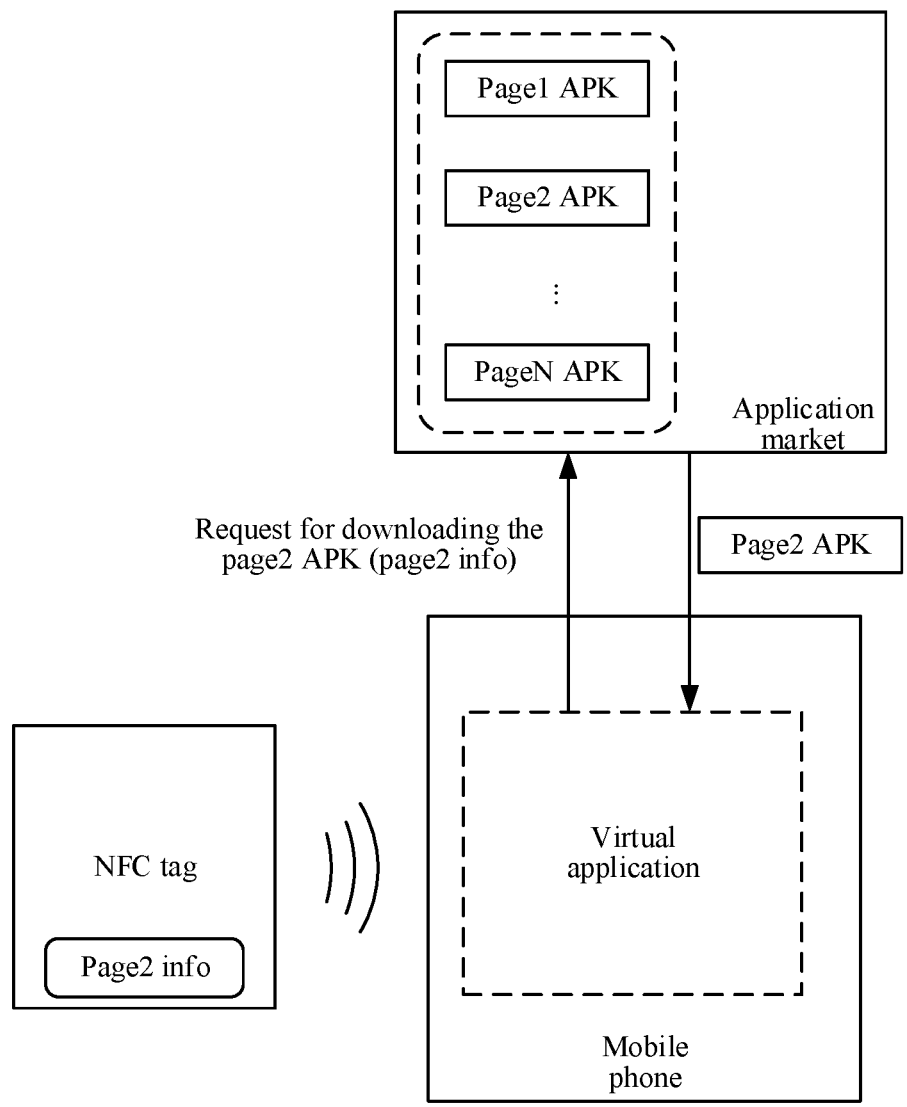
FIG. 9 is a schematic diagram of downloading a first file from an application market by a mobile phone according to an embodiment of this application.

For example, similarly, the operating system of the mobile phone is an Android™ system, the format of the first file is an APK format, and the first platform is an application market. FIG. 9 is a schematic diagram of downloading the first file from the application market by the mobile phone according to an embodiment of this application. As shown in FIG. 9, it is assumed that the identification information that is of the first file and that is included in the NFC tag is "page2 info", and "page2 info" is the identification information of the page2 APK. When the mobile phone touches or approaches the NFC tag, the mobile phone may obtain "page2 info" included in the NFC tag. Then, the mobile phone may download the page2 APK from the application market by using the virtual app based on "page2 info". For example, the mobile phone may send a request for downloading the page2 APK to the application market (which may be specifically a background server of the application market). The downloading request may include "page2 info". After receiving the request for downloading the page2 APK, the application market may deliver the page2 APK to the mobile phone.

Similarly, the mobile phone may download the page1 APK from the application market by using the virtual app based on the identification information of the page1 APK, download the pageN APK from the application market by using the virtual app based on identification information of the pageN APK, or the like. Details are not described.

After downloading the first file from the first platform by using the virtual app, the mobile phone may perform S603.

S603: The mobile phone caches the first file by using the virtual app, and displays the third-party page based on the first file.

For example, the first file is the page2 APK shown in FIG. 9. After the mobile phone downloads the page2 APK from the application market, the mobile phone may cache the page2 APK by using the virtual app, for example, may cache the page2 APK in storage space corresponding to the virtual app. In addition, the mobile phone may further display the third-party page, namely, page2, by using the virtual app based on the page2 APK.

Figure 10:
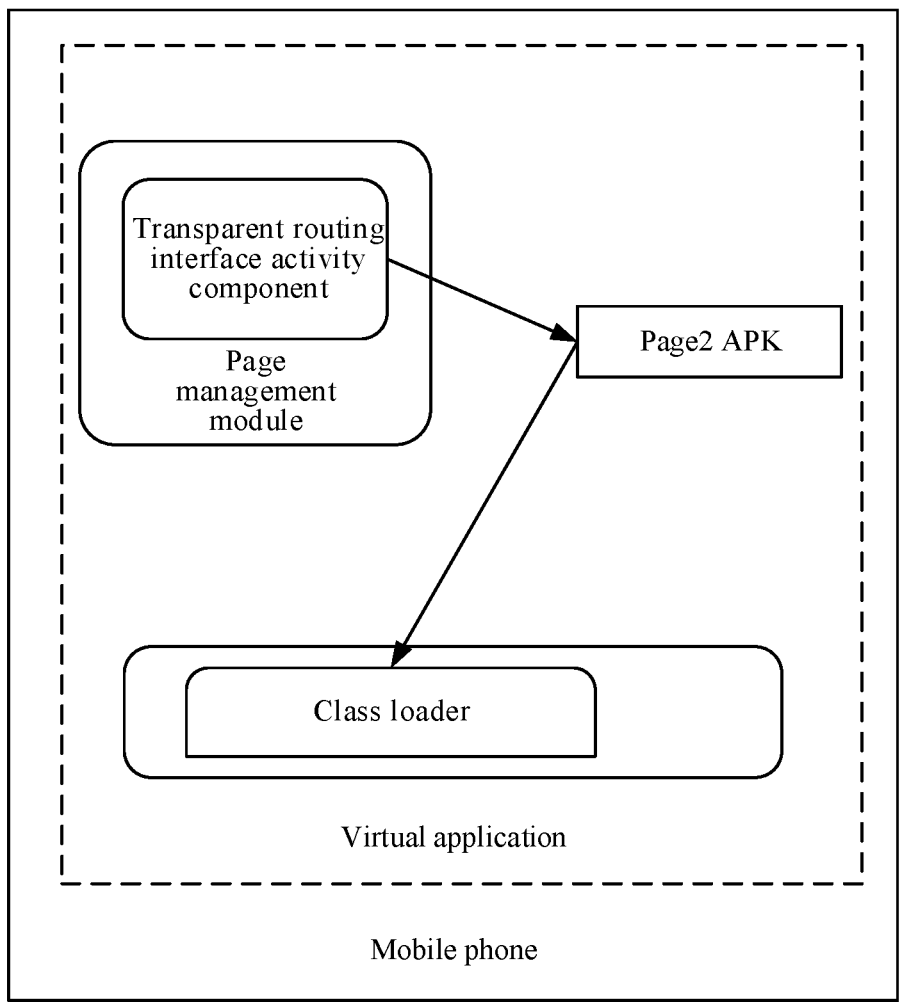
FIG. 10 is a schematic architectural diagram of a virtual app according to an embodiment of this application.

For example, similarly, the operating system of the mobile phone is an Android™ system, the format of the first file is an APK format, and the first platform is an application market. FIG. 10 is a schematic architectural diagram of the virtual app according to an embodiment of this application. As shown in FIG. 10, the virtual app may include a page management module, namely, a base APK, and a class loader, namely, classloader. The base APK may provide a transparent routing interface activity component, namely, a router activity.

The base APK may be configured to implement a function of downloading a page APK from the application market by the virtual app based on identification information of the page APK. That is, after obtaining the identification information of the page APK included in the NFC tag, the mobile phone may download the corresponding page APK from the application market by using the base APK in the virtual app. For example, the base APK may trigger the mobile phone to send a request for downloading a page APK to a background (for example, a server) of the application market, and then the background of the application market may deliver the corresponding page APK to the mobile phone.

In addition, the base APK may be further configured to implement a function of caching a page APK by the virtual app and displaying a corresponding page based on the page APK. For example, the base APK may cache the page2 APK downloaded from the application market in the storage space corresponding to the virtual app. Then, the base APK may load the page2 APK to the class loader by modifying the class loader through reflection, and invoke the router activity to jump to and display the corresponding third-party page, namely, page2.

Similarly, when the mobile phone downloads other page APKs such as the page1 APK and the pageN APK from the application market, the base APK may separately load the other page APKs and display corresponding pages in a manner the same as the manner of displaying page2. Details are not described.

Figure 11:
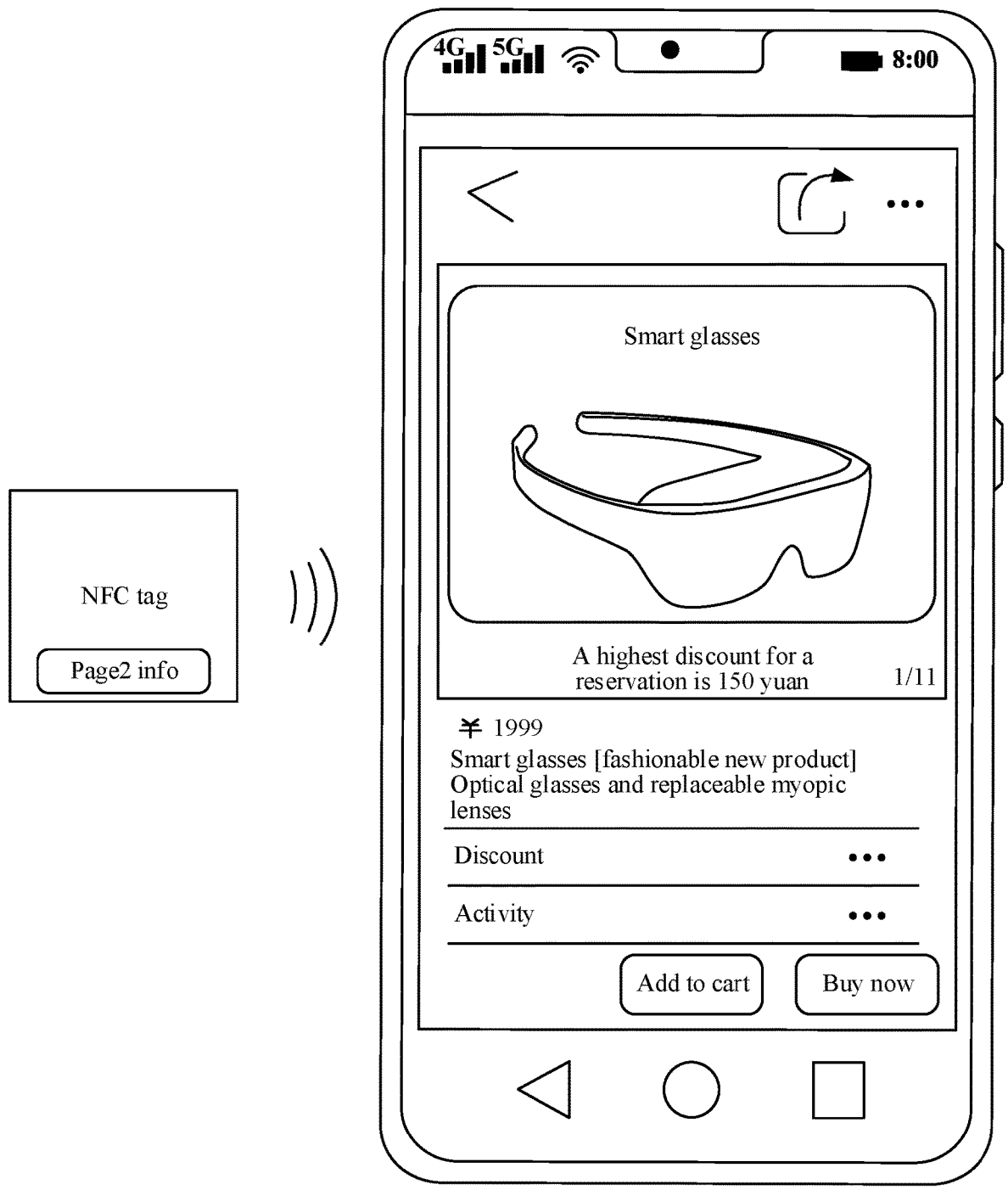
FIG. 11 is a schematic diagram of a scenario in which a mobile phone touches an NFC tag that includes identification information of a page2 APK, and displays page2 according to an embodiment of this application.

For example, the page2 APK shown in FIG. 9 is a page APK made based on the commodity purchase page of smart glasses shown in (a) in FIG. 1 (that is, page2 is the commodity purchase page of smart glasses shown in (a) in FIG. 1). FIG. 11 is a schematic diagram of a scenario in which the mobile phone touches the NFC tag that includes the identification information of the page2 APK, and displays page2 according to an embodiment of this application. As shown in FIG. 11, after the mobile phone touches the NFC tag that includes the identification information of the page2 APK, and downloads the page2 APK from the application market, the base APK loads the page2 APK to the class loader, and invokes the router activity to jump to and display corresponding page2, so that the mobile phone can display, to the user, the commodity purchase page of smart glasses shown in (a) in FIG. 1.

In this embodiment of this application, the mobile phone may cache the first file by using the virtual app. Therefore, when the user wants to view the third-party page again, the user may perform, on the mobile phone, an operation of opening the third-party page. The mobile phone may display the third-party page based on the cached first file in response to the operation of opening the third-party page by the user, to reproduce the third-party page.

For example, the mobile phone may display an application icon of the virtual app. When the user wants to view the third-party page again, the user may tap the application icon of the virtual app. The mobile phone may display an application interface of the virtual app in response to the operation of tapping the application icon of the virtual app by the user. The application interface of the virtual app may include a page card (which may be referred to as a first card) of the third-party page corresponding to the cached first file. The operation (namely, a first operation) of opening the third-party page by the user may be an operation of tapping the page card of the third-party page. The mobile phone may display the corresponding third-party page based on the cached first file in response to the operation of tapping the page card of the third-party page by the user. The page card may also be referred to as another name such as a card, a page identifier, a page icon, or a page open button. This is not limited herein.

In an implementation, the mobile phone may display the application icon of the virtual app on a leftmost screen. The leftmost screen is a display interface that appears after sliding to the right is performed on a home screen (or referred to as a home screen) of the mobile phone. An application and a function that are frequently used by the user, subscribed services and information, and the like may be displayed on the leftmost screen, to facilitate quick browsing and use by the user. For example, when a current display interface of the mobile phone is the home screen, the user may perform an operation of sliding to the right on the screen of the mobile phone, to trigger the mobile phone to switch the display interface from the home screen to the leftmost screen.

Figure 12A:
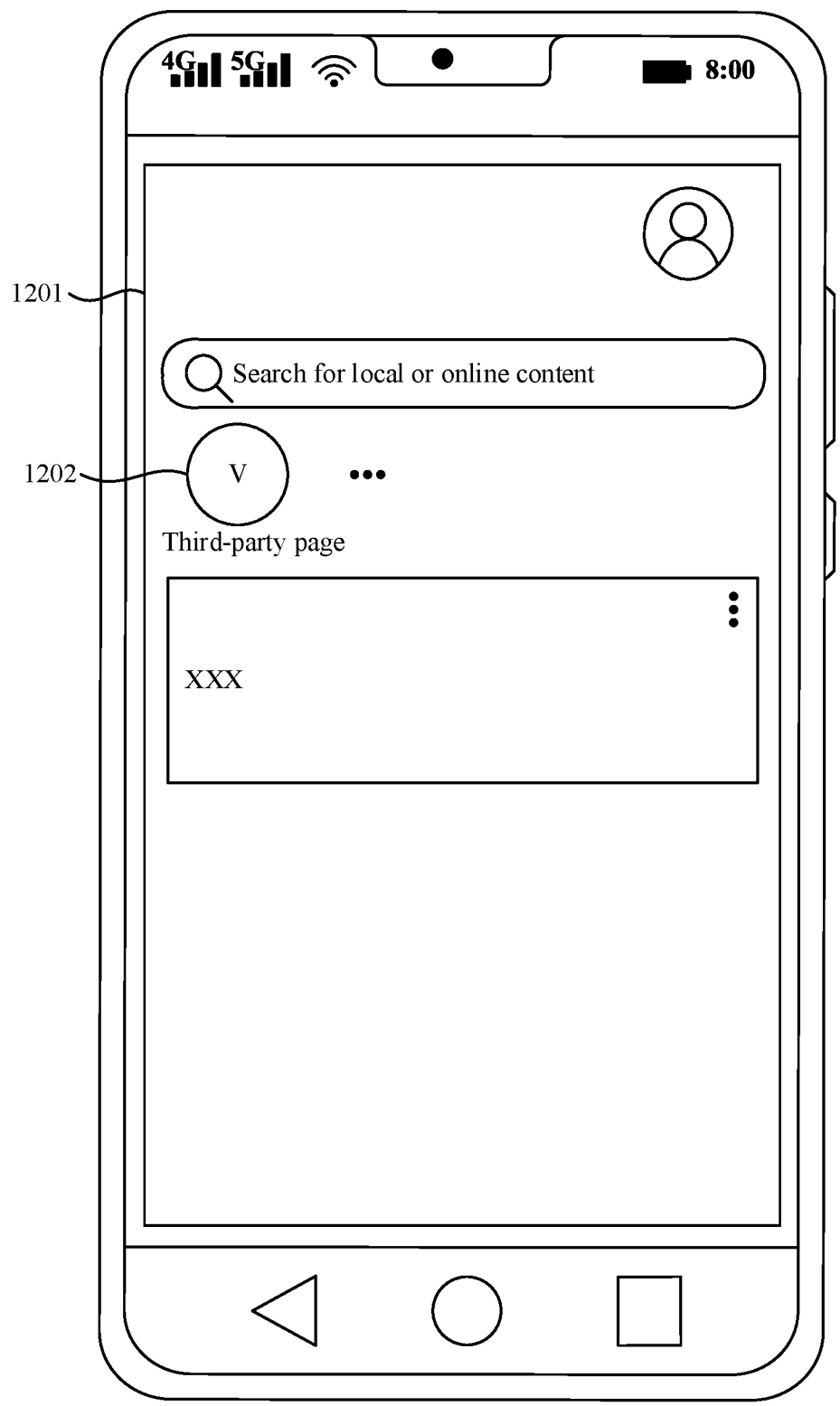
FIG. 12A is a schematic diagram of a leftmost screen according to an embodiment of this application.

For example, FIG. 12A is a schematic diagram of the leftmost screen according to an embodiment of this application. As shown in FIG. 12A, the mobile phone may display an application icon 1202 of the virtual app on a leftmost screen 1201. A text prompt "third-party page" may be displayed below the application icon 1202, to prompt the user with information indicating that an application (the virtual app) corresponding to the application icon 1202 may be used to display the third-party page. The user may tap the application icon 1202 on the leftmost screen 1201, and the mobile phone may open the application interface of the virtual app in response to the operation of tapping the application icon 1202 by the user.

It may be understood that the "leftmost screen" is merely a word used in this embodiment of this application, and a meaning represented by the "leftmost screen" is recorded in this embodiment of this application. However, a name of the "leftmost screen" cannot constitute any limitation on this embodiment of this application. In addition, in some other embodiments, the "leftmost screen" may also be referred to as another name such as a "home screen assistant", a "shortcut menu", or a "widget set interface". This is not limited herein.

In another implementation, the mobile phone may display the application icon (or referred to as a button) of the virtual app in a drop-down interface. The drop-down interface is a display interface that appears after downward sliding is performed on a top of a home screen (or referred to as a home screen) of the mobile phone. A button of a function commonly used by the user, for example, WLAN and Bluetooth, may be displayed in the drop-down interface, to help the user quickly use the related function. For example, when a current display interface of the mobile phone is the home screen, the user may perform a downward sliding operation on the top of the screen of the mobile phone, to trigger the mobile phone to switch the display interface from the home screen to the drop-down interface (or display the drop-down interface on the home screen in a stacked manner).

Figure 12B:
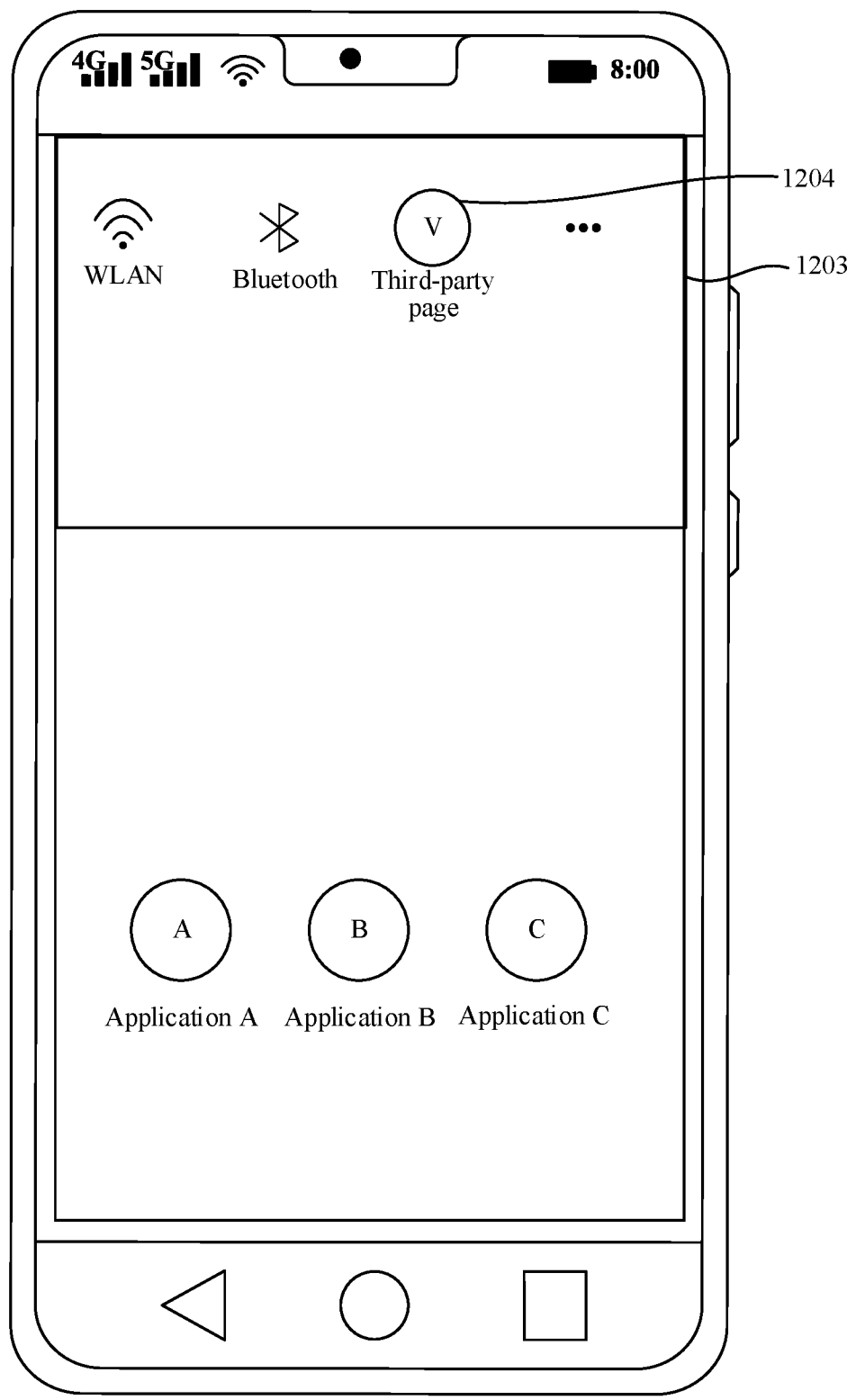
FIG. 12B is a schematic diagram of a drop-down interface of a mobile phone according to an embodiment of this application.

For example, FIG. 12B is a schematic diagram of the drop-down interface of the mobile phone according to an embodiment of this application. As shown in FIG. 12B, the mobile phone may display an application icon 1204 of the virtual app in a drop-down interface 1203. A text prompt "third-party page" may also be displayed below the application icon 1204, to prompt the user with information indicating that an application (the virtual app) corresponding to the application icon 1204 may be used to display the third-party page. The user may tap the application icon 1204 in the drop-down interface 1203, and the mobile phone may open the application interface of the virtual app in response to the operation of tapping the application icon 1204 by the user.

In still another implementation, the mobile phone may display the application icon (or referred to as a home screen shortcut) of the virtual app on a home screen (or referred to as a home screen).

Figure 12C:
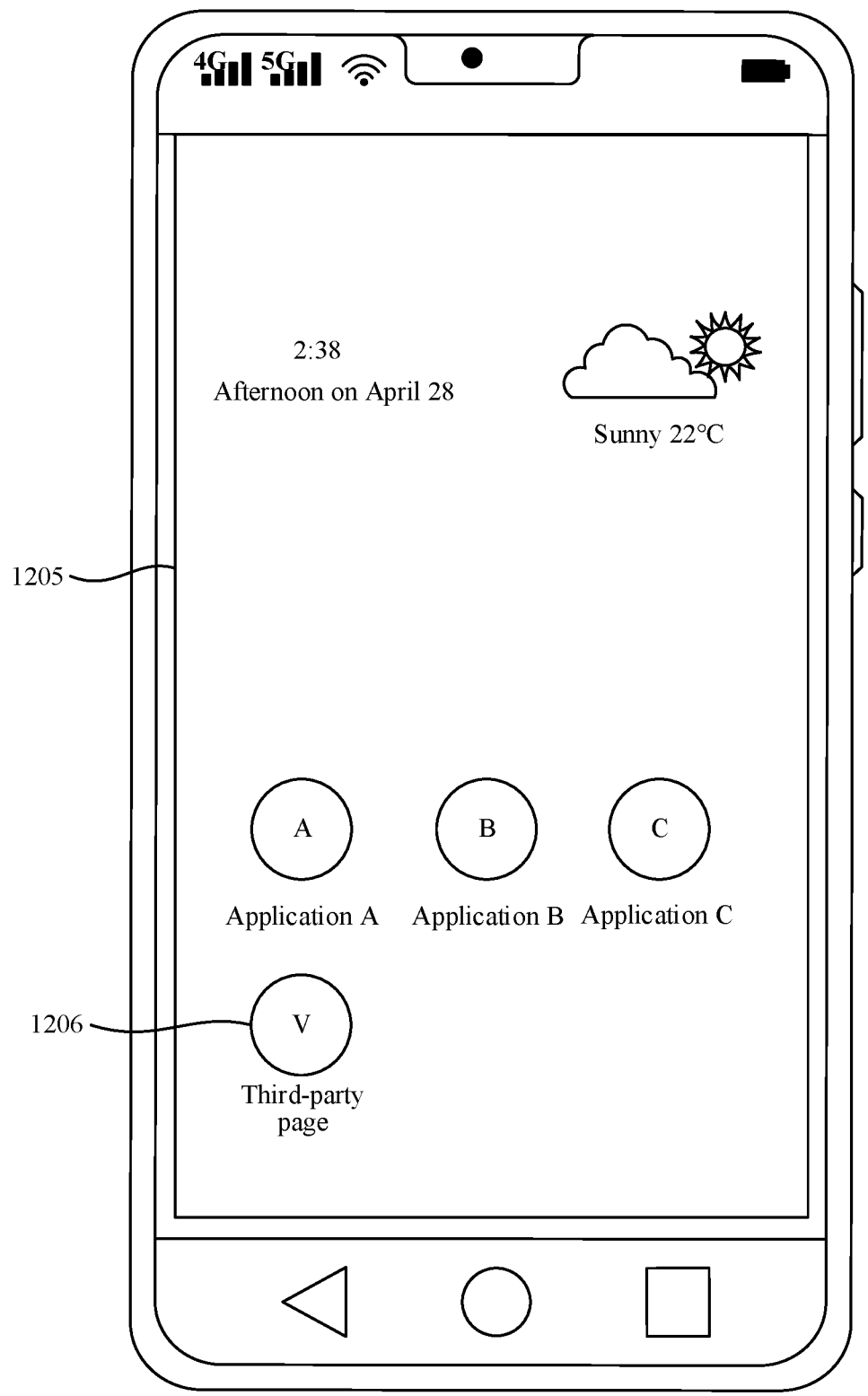
FIG. 12C is a schematic diagram of a home screen of a mobile phone according to an embodiment of this application.

For example, FIG. 12C is a schematic diagram of the home screen of the mobile phone according to an embodiment of this application. As shown in FIG. 12C, the mobile phone may display an application icon 1206 of the virtual app on a home screen 1205. A text prompt "third-party page" may also be displayed below the application icon 1206, to prompt the user with information indicating that an application (the virtual app) corresponding to the application icon 1206 may be used to display the third-party page. The user may tap the application icon 1206 on the home screen 1205, and the mobile phone may open the application interface of the virtual app in response to the operation of tapping the application icon 1206 by the user.

It should be understood that the implementation in which the mobile phone displays the application icon of the virtual app on the leftmost screen, in the drop-down interface, or the home screen is merely an example for description. A specific implementation in which the mobile phone displays the application icon of the virtual app is not limited in this application. In addition, the application icon of the virtual app shown in each of FIG. 12A, FIG. 12B, and FIG. 12C may be understood as a functional control corresponding to a start portal of the virtual app. In some other implementations, the functional control corresponding to the start portal of the virtual app may not be implemented in a manner of using an application icon (or a home screen shortcut). This is not limited herein either. In this application, the leftmost screen, the drop-down interface, the home screen, and the like respectively shown in FIG. 12A, FIG. 12B, and FIG. 12C may be referred to as third interfaces. The operation of tapping, by the user, the functional control corresponding to the start portal of the virtual app (or a first interface) may be referred to as a fifth operation.

Figure 13:
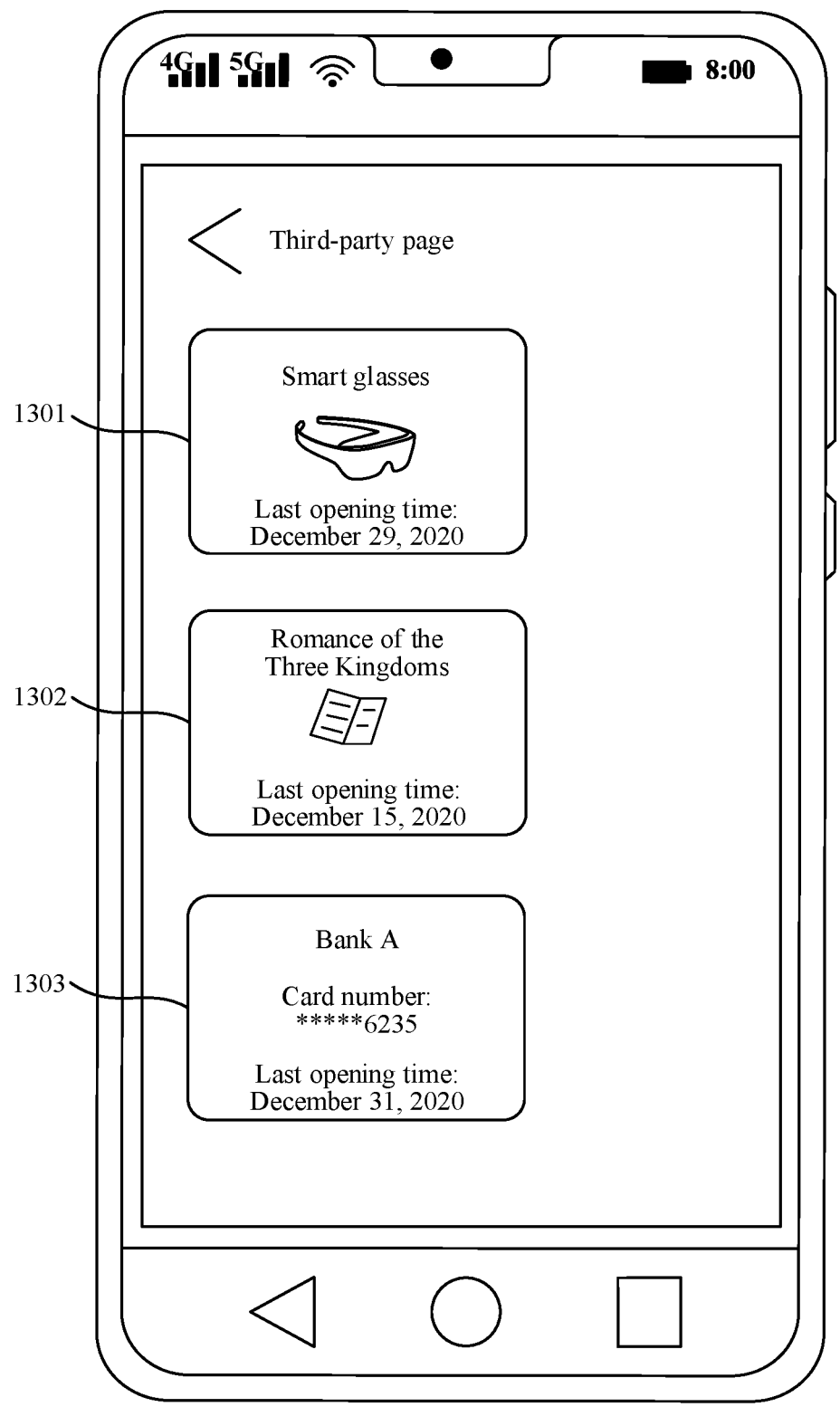
FIG. 13 is a schematic diagram of an application interface of a virtual app according to an embodiment of this application.

For example, FIG. 13 is a schematic diagram of the application interface of the virtual app according to an embodiment of this application. As shown in FIG. 13, it is assumed that the first file cached in the virtual app includes the page1 APK, the page2 APK, and a page3 APK, a third-party page (page1) corresponding to the page1 APK is a commodity purchase page of smart glasses, a third-party page (page2) corresponding to the page2 APK is a reading page (or referred to as a display page) of a novel "Romance of the Three Kingdoms", and a third-party page (page3) corresponding to the page3 APK is a payment page provided by a bank A. In this case, the application interface of the virtual app may include a page card 1301 corresponding to the commodity purchase page of smart glasses, a page card 1302 corresponding to the reading page of the novel "Romance of the Three Kingdoms", and a page card 1303 corresponding to the payment page provided by the bank A. Each page card includes identification information (a page identifier) of a corresponding third-party page. For example, the page card 1301 includes text "smart glasses", and the page card 1302 includes text "Romance of the Three Kingdoms". When the user wants to view the commodity purchase page of smart glasses again, the user may tap the page card 1301. The mobile phone may display the commodity purchase page of smart glasses based on the cached page1 APK in response to the operation of tapping the page card 1301 by the user. Similarly, the user may view the reading page of the novel "Romance of the Three Kingdoms" or the payment page provided by the bank A. A specific principle of displaying, by the mobile phone, the corresponding third-party page based on the cached page APK is the same as the process shown in FIG. 10. Details are not described.

Optionally, as still shown in FIG. 13, in the application interface of the virtual app, the page card may further include a last opening time of the corresponding page (for example, a last opening time of the commodity purchase page of smart glasses is Dec. 15, 2020), a pattern that can indicate page content (for example, a pattern of smart glasses in the page card 1301), and the like. The pattern that can indicate the page content and that is displayed in the page card may enable the user to more intuitively understand the page content. Content displayed in the page card is not limited in this application. For example, the page card may further include an identifier of a page type of the corresponding third-party page, for example, shopping or payment.

Optionally, when the third-party page is a page that needs to be opened by invoking another application, or when the third-party page is a page in another application, the page card displayed in the application interface of the virtual app may further include an application name corresponding to the corresponding page.

FIG. 13 is merely an example for description. The content displayed in the page card and a specific presentation form of the page card are not limited in this application. For example, the page card may alternatively be presented in a form of a list.

Optionally, in some other embodiments of this application, the virtual app may further classify all page cards, and classify different page cards into different types of folders based on types of the page cards, for example, a first folder and a second folder. The application interface of the virtual app may include each type of folder (for example, at least one type). When the user taps a folder, the mobile phone may display, in response to the operation of tapping the folder by the user, a page card included in the folder.

Figure 14A:
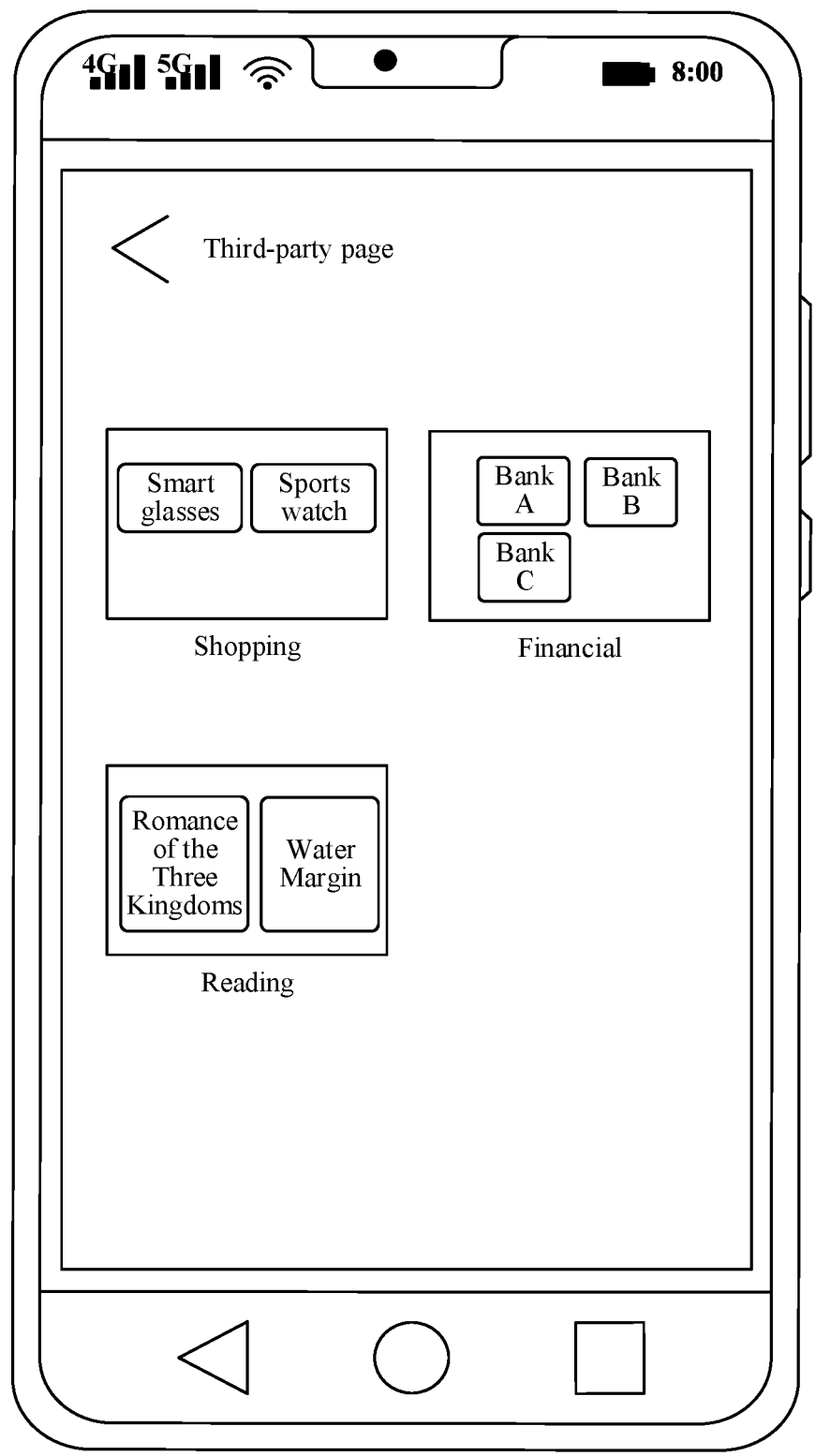
FIG. 14A is another schematic diagram of an application interface of a virtual app according to an embodiment of this application.

For example, FIG. 14A is another schematic diagram of the application interface of the virtual app according to an embodiment of this application. As shown in FIG. 14A, the application interface of the virtual app may include the following folders: a shopping folder, a financial folder, and a reading folder. The page card shown in FIG. 13 is used as an example. The page card 1301 corresponding to the commodity purchase page of smart glasses may be classified into the shopping folder, the page card 1302 corresponding to the reading page of the novel "Romance of the Three Kingdoms" may be classified into the reading folder, and the page card 1303 corresponding to the payment page provided by the bank A may be classified into the financial folder. When the user taps the shopping folder, the mobile phone may display, in response to the operation of tapping the shopping folder by the user, a page card included in the shopping folder. The shopping folder may be referred to as a first folder, the financial folder may be referred to as a second folder, and the reading folder may be referred to as a third folder.

Figure 14B:
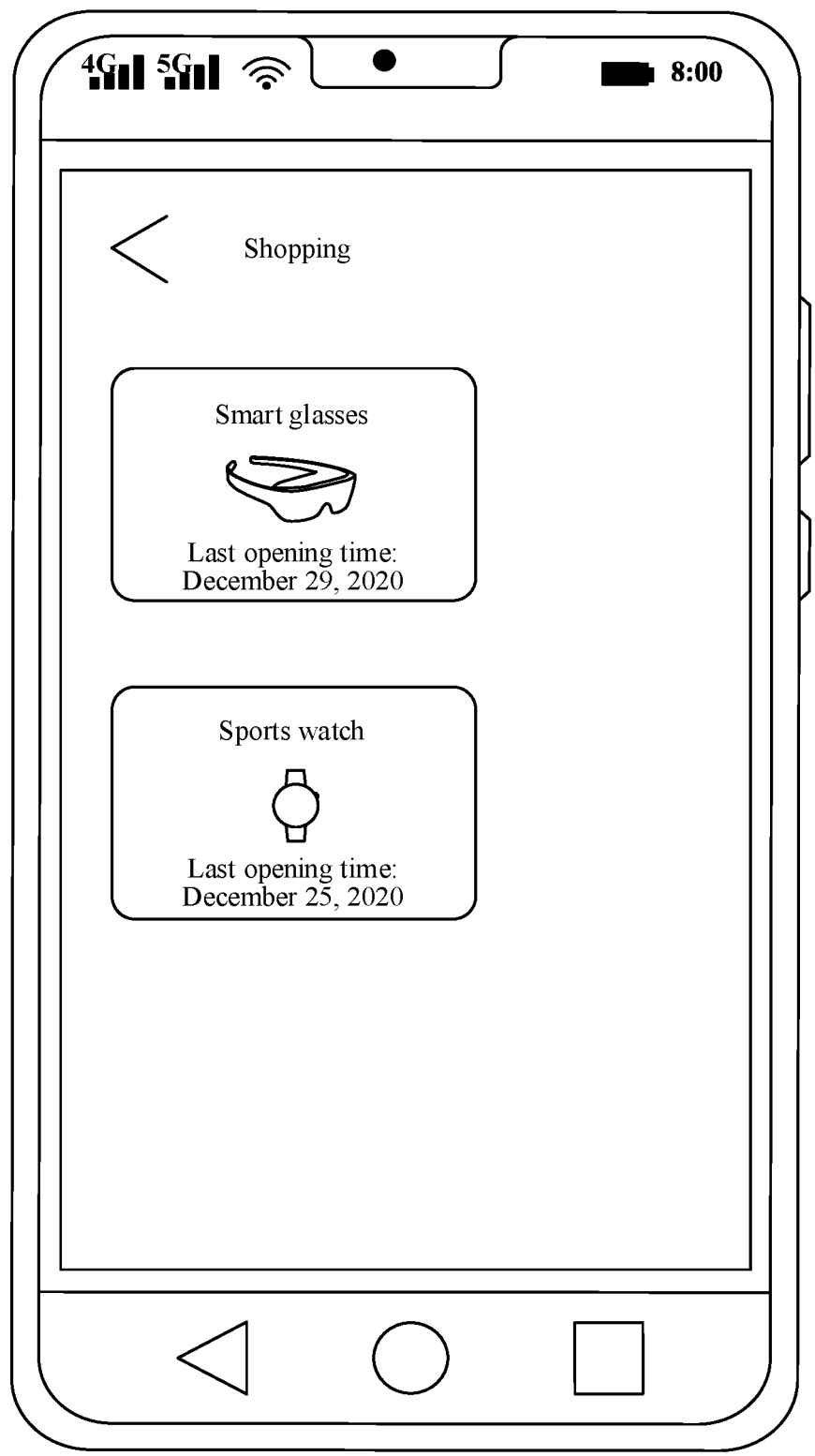
FIG. 14B is still another schematic diagram of an application interface of a virtual app according to an embodiment of this application.

For example, FIG. 14B is still another schematic diagram of the application interface of the virtual app according to an embodiment of this application. As shown in FIG. 14B, it is assumed that page cards included in the shopping folder are the page card corresponding to the commodity purchase page of smart glasses and a page card corresponding to a commodity purchase page of a sports watch. After the user taps the shopping folder shown in FIG. 14A, the virtual app may display an interface shown in FIG. 14B. The user may tap any page card in the interface shown in FIG. 14B, to trigger the mobile phone to display a corresponding third-party page. A specific principle is the same as the process described in FIG. 13. Details are not described.

Similarly, the user may tap to view page cards included in other folders such as the financial folder and the reading folder. Details are not described.

It should be understood that the foregoing descriptions of the display manner of the page card and the classification manner of the page card are examples for description. This is not limited in this application. For example, classification folders of the page card may further include a fourth folder and a fifth folder. For example, the fourth folder may be an advertisement folder, and the fifth folder may be a video folder. Cards included in different folders are of different page types.

In this application, the interface shown in FIG. 13 or FIG. 14A may be referred to as a first interface, the interface shown in FIG. 14B may be referred to as a second interface, and an operation of tapping to open a folder by the user may be referred to as a third operation.

Optionally, when a function of downloading the first file from the first platform based on the identification information of the first file and a function of caching the first file and displaying the third-party page based on the first file by the mobile phone are implemented by using a first service deployed at a system layer of the mobile phone, the mobile phone may further provide, with reference to a manner similar to that of the first application, the user with an operation interface that can be used to open the third-party page and a functional control (for example, an icon or a button) corresponding to a start portal of the operation interface. Details are not described herein.

Optionally, in some embodiments, the virtual app described above may be an application preset by a mobile phone supplier in a read-only memory (ROM) in the mobile phone in advance. For example, the ROM in the mobile phone may be the internal memory 521 shown in FIG. 5.

Alternatively, in some other embodiments, a developer of the virtual app may provide a downloading address (which may be a URL address) of the virtual app. For example, an installation package of the virtual app may be uploaded to the application market, and the downloading address of the virtual app may be the application market (the downloading address of the virtual app may alternatively be another server, and is not limited). The provider of the third-party page may further write the downloading address of the virtual app into the NFC tag. When the mobile phone performs the first interaction operation with the NFC tag, the mobile phone may further obtain the downloading address of the virtual app from the NFC tag. The downloading address of the virtual app may indicate that the mobile phone needs to open the third-party page by using the virtual app. After the mobile phone obtains the downloading address of the virtual app from the NFC tag, the downloading address of the virtual app may trigger the mobile phone to detect whether the virtual app is installed. If the mobile phone detects that the virtual app is not installed (or deployed), downloading, installation, and start of the virtual app are triggered. For example, after the mobile phone touches the NFC tag, if it is detected that the virtual app is not installed, the mobile phone may download the installation package of the virtual app from the application market based on the downloading address of the virtual app, install the virtual app, and start and run the successfully installed virtual app. Then, the mobile phone may implement the method in this embodiment of this application by using the virtual app in the manner described in the foregoing embodiment. If the mobile phone detects that the virtual app is installed, the mobile phone may directly implement the method in this embodiment of this application by using the virtual app in the manner described in the foregoing embodiment.

A manner in which the mobile phone downloads the installation package of the virtual app from the application market is similar to the manner in which the mobile phone downloads the page APK from the application market in the foregoing embodiment. For example, the mobile phone may send a request for downloading the installation package of the virtual app to the background of the application market, and the background of the application market may deliver the installation package of the virtual app to the mobile phone based on the request for downloading the installation package of the virtual app. A format of the installation package of the virtual app is adapted to the operating system of the mobile phone. For example, when the operating system of the mobile phone is the Android™ system, the installation package of the virtual app may also be in the APK format.

It should be understood that an initial state (namely, a state existing when the virtual app is installed on the mobile phone for the first time) of the virtual app may include only the base APK described above, and does not include any page APK.

Optionally, when the mobile phone performs the first interaction operation with the NFC tag to trigger downloading of the page APK, the mobile phone may further display first prompt information by using the application interface of the virtual app. The first prompt information prompts the user to determine whether to download the page APK. For example, the first indication information may include "Are you sure you want to download the page APK". In addition, functional controls "yes" and "no" may be further displayed below the first prompt information. The user may actively select "yes" or "no", to trigger the mobile phone to download or not to download the page APK.

Optionally, the mobile phone may display the first indication information only when downloading of the page APK is triggered for the first time. After the user chooses to agree to the downloading (for example, taps the functional control "yes"), there is no prompt when another page APK is downloaded subsequently, to ensure smoothness.

In some embodiments, after the mobile phone caches the first file by using the virtual app, the mobile phone may further query, in the background by using the virtual app and an interface based on a preset period, whether the cached first file is updated on the first platform. For example, the mobile phone may send a query request to the first platform by using the virtual app based on the preset period, and the first platform may return an update status of the first file to the mobile phone based on the query request. If the cached first file is updated on the first platform, the mobile phone may further display an update reminder of the first file, to remind the user that the first file is updated. After seeing the update reminder of the first file, the user may actively perform an update operation on the first file or ignore the update reminder of the first file. After receiving the update operation performed by the user on the first file, the mobile phone may re-download an updated first file from the first platform in response to the update operation performed by the user on the first file, and replace the previously cached first file with the updated first file. The updated first file may also be referred to as a second file.

The preset period may be 1 minute, 5 minutes, 10 minutes, 1 day, 2 days, or the like. A magnitude of the preset period is not limited herein.

Figure 15:
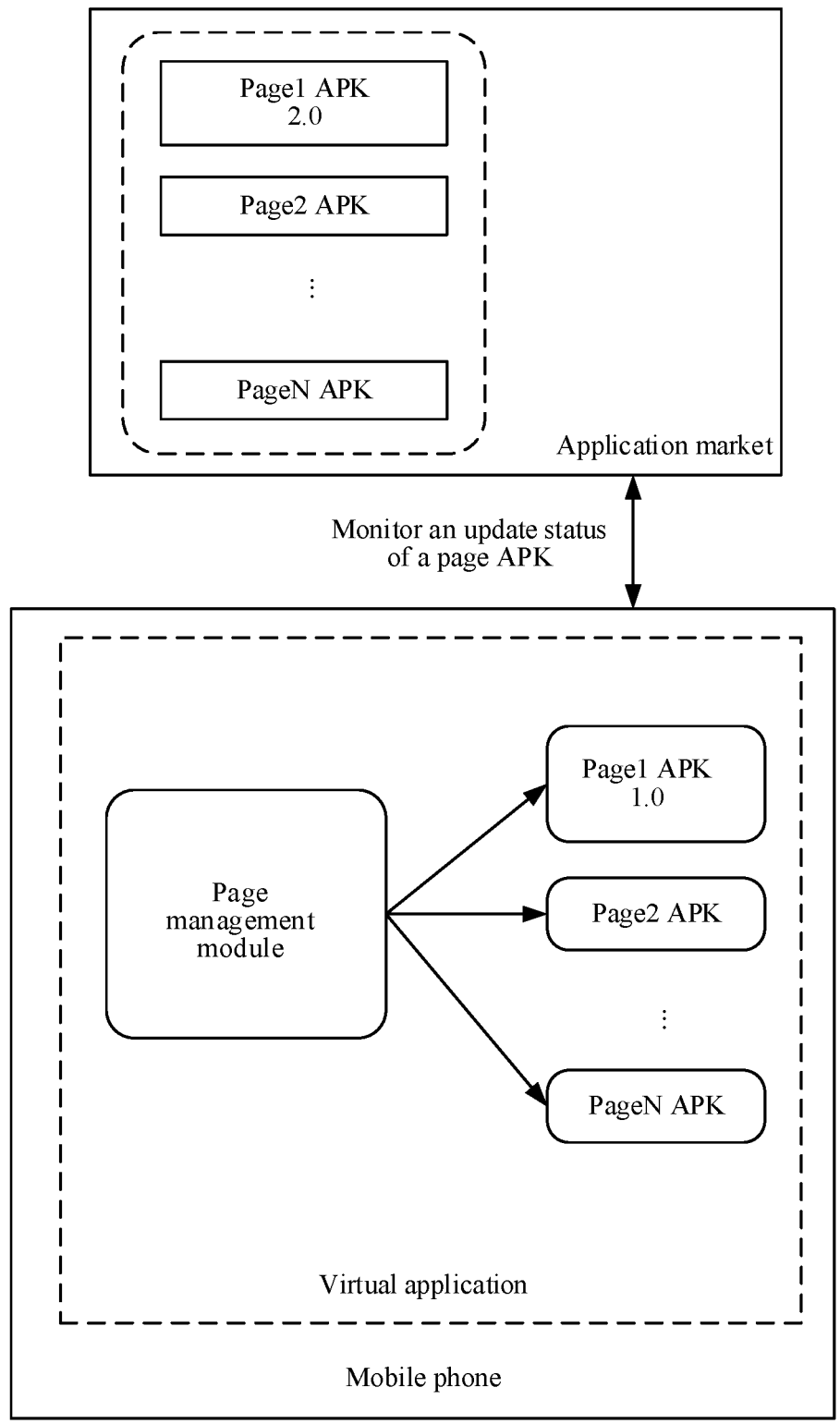
FIG. 15 is a schematic diagram in which a mobile phone monitors an update status of a page APK according to an embodiment of this application.

For example, the first file is a page APK, and the first platform is an application market. FIG. 15 is a schematic diagram in which the mobile phone monitors an update status of a page APK according to an embodiment of this application. As shown in FIG. 15, it is assumed that the page1 APK cached in the base APK in the virtual app is of a version 1.0. However, the page1 APK in the application market is updated to a version 2.0. In this case, when querying version information (or referred to as an update status) of the page1 APK in the application market in the background of the mobile phone by using an interface based on the preset period, the base APK in the virtual app may detect, in a timely manner, that a page status of the page1 APK is changed from the version 1.0 to the version 2.0. It should be understood that when the merchant updates the page1 APK in the application market from the version 1.0 to the version 2.0, the identification information of the page1 APK included in the page1 APK of the version 2.0 remains unchanged. The mobile phone can still download the page1 APK of the version 2.0 from the application market based on the identification information of the page1 APK obtained from the NFC tag. The merchant does not need to update the NFC tag.

Figure 16:
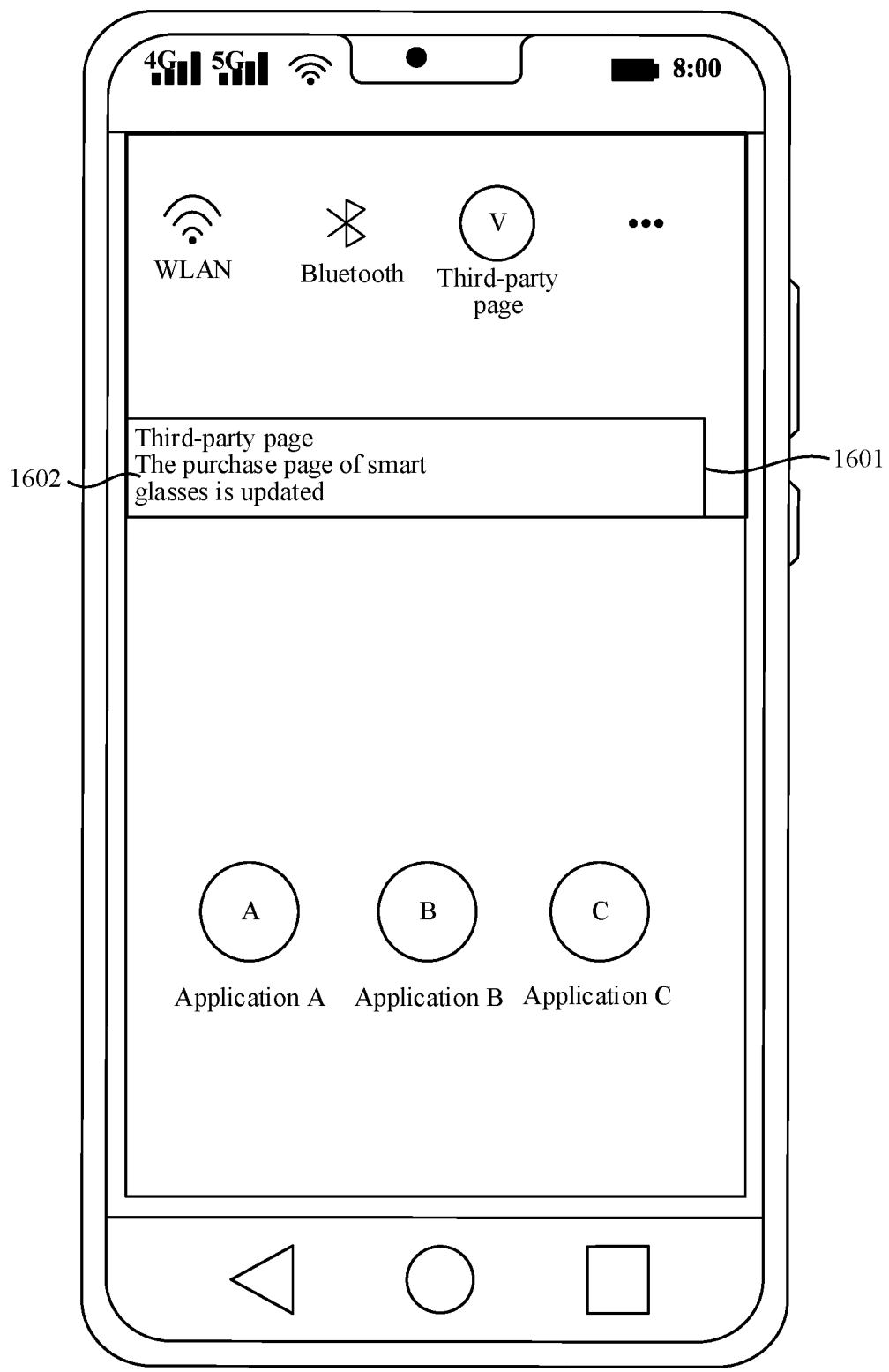
FIG. 16 is a schematic diagram of another drop-down interface of a mobile phone according to an embodiment of this application.

When the base APK detects that the page status of the page1 APK is changed from the version 1.0 to the version 2.0, an update reminder of the page1 APK may be displayed by using a message bar (or referred to as a notification bar) of the mobile phone. The message bar may be displayed in the drop-down interface of the mobile phone. For example, FIG. 16 is a schematic diagram of another drop-down interface of the mobile phone according to an embodiment of this application. As shown in FIG. 16, the drop-down interface of the mobile phone may further include a message bar 1601. For example, the page1 APK is a page APK corresponding to a purchase page of smart glasses. When the base APK detects that the page status of the page1 APK is changed from the version 1.0 to the version 2.0, the update reminder "The purchase page of smart glasses is updated" 1602 of the page1 APK may be displayed in the message bar 1601.

After seeing the update reminder "The purchase page of smart glasses is updated" 1602 of the page1 APK displayed in the message bar 1601, the user may choose to actively update the page1 APK or ignore the update reminder. When the user wants to update the page1 APK, the user may tap the update reminder "The purchase page of smart glasses is updated" 1602. The mobile phone may display an update operation interface corresponding to the page1 APK in response to the operation of tapping the update reminder "The purchase page of smart glasses is updated" 1602 by the user. The update operation interface corresponding to the page1 APK may alternatively be provided by the virtual app.

Figure 17:
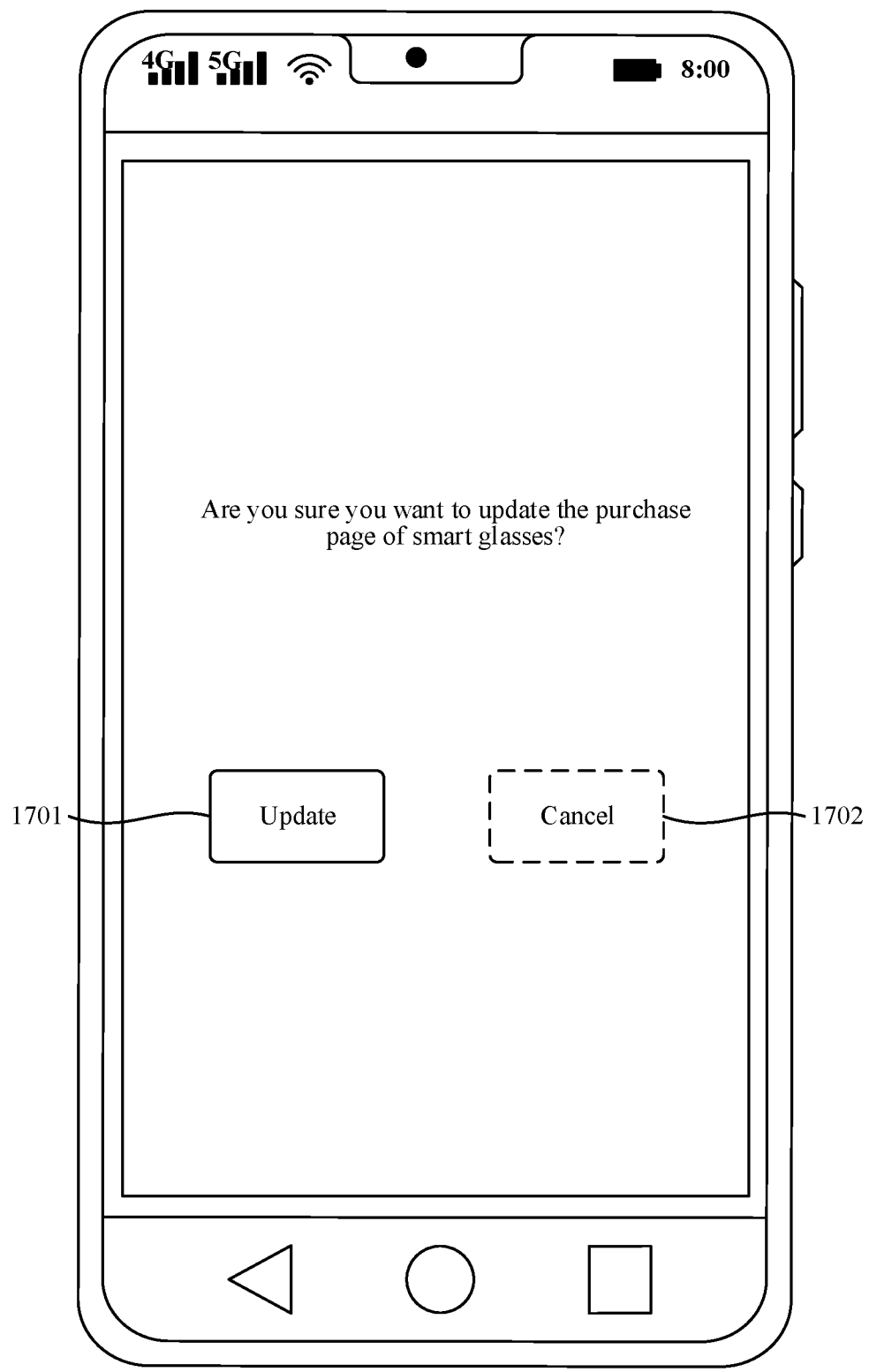
FIG. 17 is a schematic diagram of an update operation interface corresponding to a page1 APK according to an embodiment of this application.

For example, similarly, the page1 APK is a page APK corresponding to a purchase page of smart glasses. FIG. 17 is a schematic diagram of the update operation interface corresponding to the page1 APK according to an embodiment of this application. As shown in FIG. 17, the update operation interface corresponding to the page1 APK may include a text prompt "Are you sure you want to update the purchase page of smart glasses", an update button 1701, and a cancel button 1702. When the user taps the update button 1701, the mobile phone may re-download the page1 APK of the version 2.0 from the application market in response to the operation of tapping the update button 1701 by the user, and replace the previously cached page1 APK of the version 1.0 with the page1 APK of the version 2.0. When the user taps the cancel button 1702, the mobile phone may exit, in response to the operation of tapping the cancel button 1702 by the user, the interface shown in FIG. 17, and return to another interface, for example, the home screen or the drop-down interface.

An operation of sequentially tapping, by the user, the update reminder "The purchase page of smart glasses is updated" 1602 shown in FIG. 16 and the update button 1701 shown in FIG. 17 is an update operation performed by the user on the page1 APK. In this application, the update operation performed by the user on the page1 APK may be referred to as a second operation.

In this embodiment, when the provider of the third-party page updates the third-party page, an updated third-party page may be made into an updated first file in a timely manner, and the updated first file is re-uploaded to the first platform. The mobile phone may monitor the update status of the first file in a timely manner, and update the cached first file. Therefore, the third-party page displayed by the mobile phone to the user based on the first file has time validity.

Optionally, in another embodiment, when the page1 APK is the purchase page of smart glasses, the update reminder of the page1 APK shown in FIG. 16 may alternatively be "The purchase page of smart glasses is updated", and "Are you sure you want to update the page1 APK" shown in FIG. 17 may alternatively be "Are you sure you want to update the purchase page of smart glasses". This is not limited herein.

Figure 18:
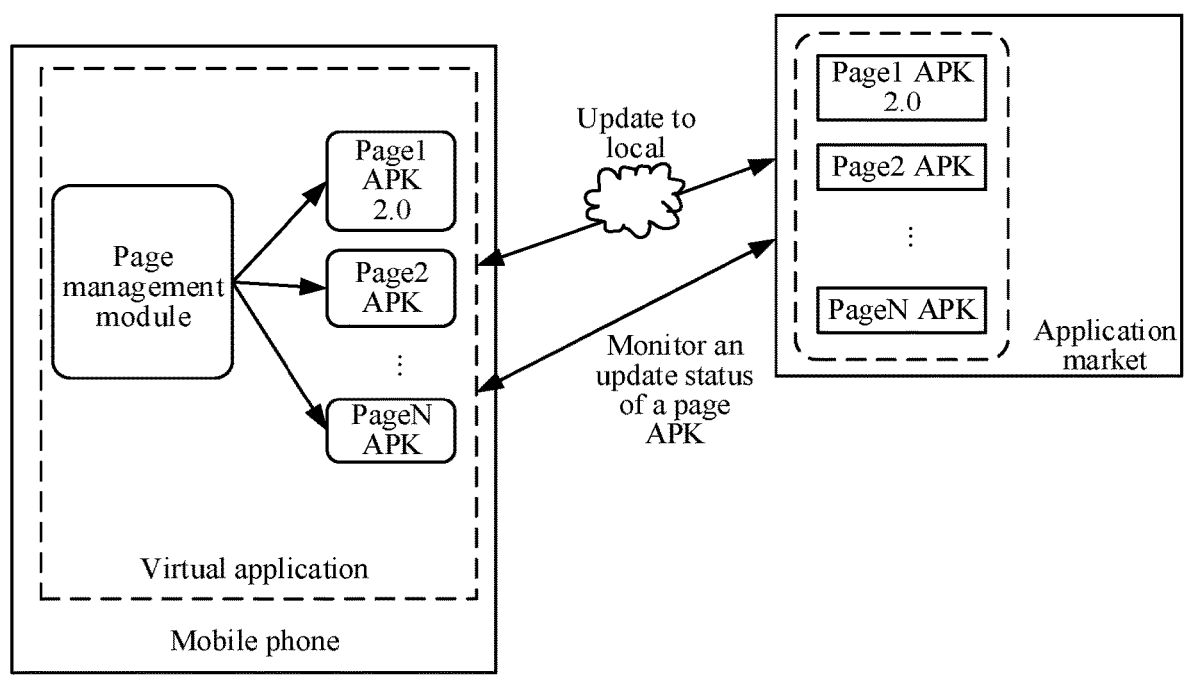
FIG. 18 is a schematic diagram of automatically updating a page APK by a mobile phone according to an embodiment of this application.

In some other embodiments, when obtaining, through query by using the virtual app, that the first file is updated, the mobile phone may automatically download an updated first file by using the virtual app, and update the cached first file to a latest version. For example, FIG. 18 is a schematic diagram of automatically updating a page APK by the mobile phone according to an embodiment of this application. As shown in FIG. 18, when the base APK detects that a page status of the page1 APK is changed from a version 1.0 to a version 2.0, the base APK may automatically re-download the page1 APK of the version 2.0, and update the cached page1 APK of the version 1.0 to the page1 APK of the version 2.0.

In some other embodiments, the mobile phone may further provide a silent upgrade switch in the virtual app. The silent upgrade switch may be a functional control in the application interface of the virtual app. Details are not described herein by using the accompanying drawings. When the user turns on the silent upgrade switch, the mobile phone may automatically update the first file. When the user turns off the silent upgrade switch, the mobile phone may display only an update reminder of the first file, and wait for the user to actively update the first file.

In an implementation, the silent upgrade switch may be used to control all first files cached in the virtual app. When the user turns on the silent upgrade switch, the mobile phone may automatically update all the cached first files.

In another implementation, a silent upgrade switch may be provided in the virtual app for each cached first file. When the user turns on a silent upgrade switch, the mobile phone may automatically update only a first file corresponding to the silent upgrade switch.

That is, in this embodiment of this application, the virtual app may support overall update of all cached page APKs, or support update of a single page APK. This is not limited herein.

In some other embodiments, when version information of a page APK in the application market is updated, the application market may actively push, to the virtual app, a message indicating that the version information of the page APK is updated (the mobile phone may not actively make a query by using the virtual app). After receiving the message indicating that the version information of the page APK is updated, the virtual app may display an update reminder of the corresponding page APK by using a message bar of the mobile phone in the manner described in the foregoing embodiment, or automatically update the corresponding page APK.

For example, when the page1 APK in the application market is updated from a version 1.0 to a version 2.0, the application market may actively push, to the virtual app that has downloaded the page1 APK of the version 1.0, a message indicating that version information of the page1 APK is updated, for example, "the page1 APK is updated to the version 2.0". After receiving the message indicating that the version information of the page1 APK is updated, the virtual app may display an update reminder of the page1 APK by using a message bar of the mobile phone in the manner described in the foregoing embodiment, or automatically update the page1 APK. For example, the application market may record identification information, such as a device number, of a mobile phone on which the virtual app that has downloaded the page1 APK is located. The application market may query the recorded identification information of the mobile phone, to determine a mobile phone that includes a virtual app that has downloaded the page1 APK of the version 1.0.

Alternatively, the application market may keep a connection to the mobile phone, and the application market may detect whether the mobile phone includes the page1 APK. When the mobile phone includes the page1 APK, the application market may actively push the message indicating that the version information of the page1 APK is updated to the virtual app in the mobile phone. This is not limited herein.

Optionally, in this embodiment of this application, the virtual app may further support the user in actively removing the cached first file.

Figure 19A:
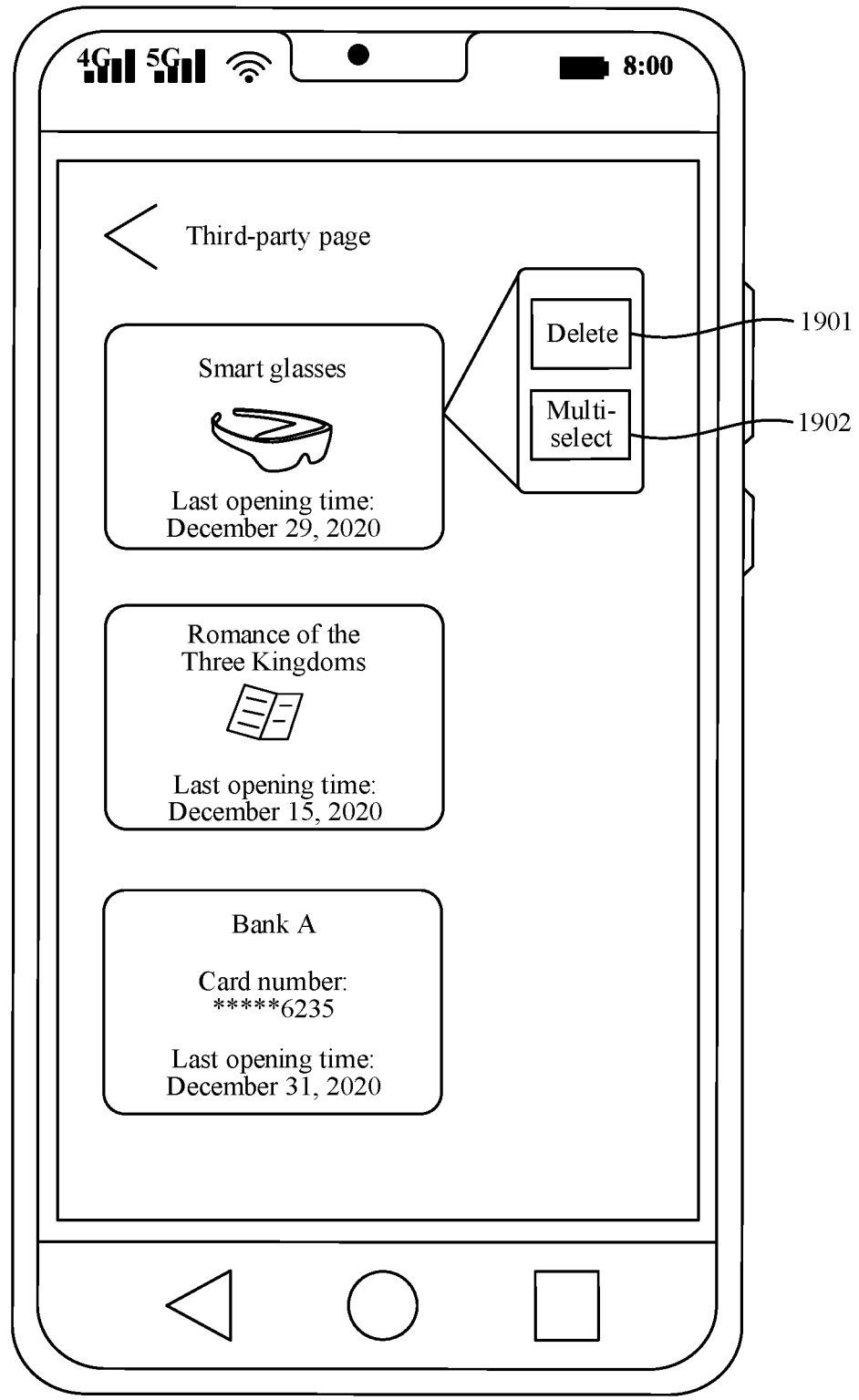
FIG. 19A is still another schematic diagram of an application interface of a virtual app according to an embodiment of this application.

Similarly, the example in FIG. 13 is used. It is assumed that the first file cached in the virtual app includes the page1 APK, the page2 APK, and a page3 APK, a third-party page (page1) corresponding to the page1 APK is a commodity purchase page of smart glasses, a third-party page (page2) corresponding to the page2 APK is a reading page (or referred to as a display page) of a novel "Romance of the Three Kingdoms", and a third-party page (page3) corresponding to the page3 APK is a payment page provided by a bank A. In this case, the application interface of the virtual app includes a page card corresponding to the commodity purchase page of smart glasses, a page card corresponding to the reading page of the novel "Romance of the Three Kingdoms", and a page card corresponding to the payment page provided by the bank A. FIG. 19A is still another schematic diagram of the application interface of the virtual app according to an embodiment of this application. As shown in FIG. 19A, when the user wants to remove the page1 APK, the user may touch and hold, in the interface shown in FIG. 13, the page card corresponding to the commodity purchase page of smart glasses. The mobile phone may display a delete button 1901 beside the page card corresponding to the commodity purchase page of smart glasses in response to the operation of touching and holding, by the user, the page card corresponding to the commodity purchase page of smart glasses. The user may tap the delete button 1901. The mobile phone may delete the page card corresponding to the commodity purchase page of smart glasses and the page1 APK in response to the operation of tapping the delete button 1901 by the user. Similarly, the user may actively perform an operation to trigger the mobile phone to delete the page card corresponding to the reading page of the novel "Romance of the Three Kingdoms" and the page2 APK, or delete the page card corresponding to the payment page provided by the bank A and the page3 APK. Details are not described.

Optionally, as still shown in FIG. 19A, when the user touches and holds the page card corresponding to the commodity purchase page of smart glasses, the mobile phone may further display a multi-select button 1902 beside the page card corresponding to the commodity purchase page of smart glasses in response to the operation of touching and holding, by the user, the page card corresponding to the commodity purchase page of smart glasses. When the user taps the multi-select button 1902, the mobile phone may jump, in response to the operation of tapping the multi-select button 1902 by the user, to an interface shown in FIG. 19B.

Figure 19B:
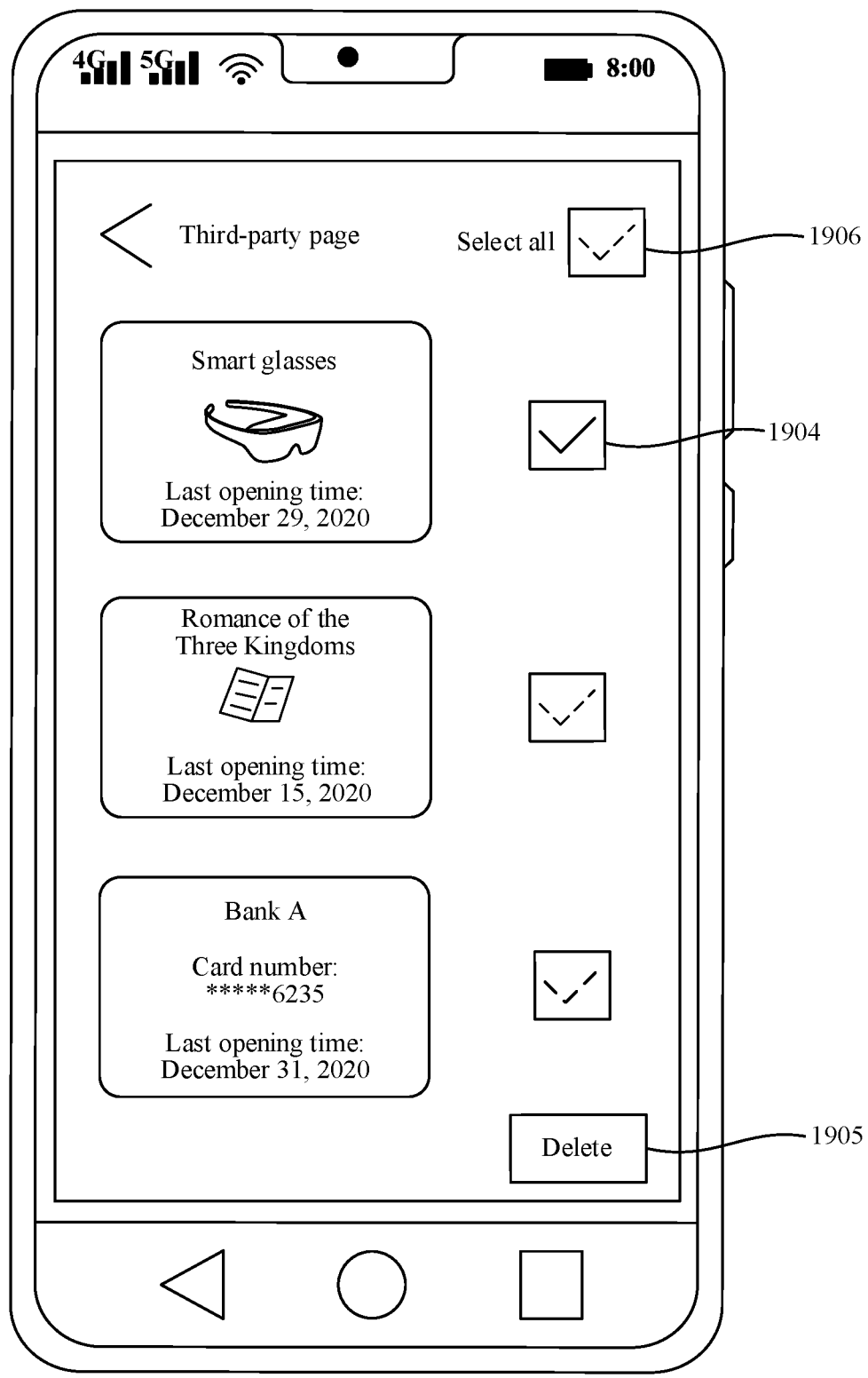
FIG. 19B is still another schematic diagram of an application interface of a virtual app according to an embodiment of this application.

FIG. 19B is still another schematic diagram of the application interface of the virtual app according to an embodiment of this application. As shown in FIG. 19B, after the user taps the multi-select button 1902, there may further be a select button after each page card in the application interface of the virtual app, for example, a select button 1904 displayed after the page card corresponding to the commodity purchase page of smart glasses, and there may further be a delete button 1905 below the application interface of the virtual app. The user may tap one or more select buttons to select a corresponding page card (for example, a solid-line check mark indicates that the card is selected, and a dashed-line check mark indicates that the card is not selected). Then, the user may tap the delete button 1905. The mobile phone may delete, in response to the operation of tapping one or more select buttons by the user and the operation of tapping the delete button 1905, the page card selected by the user and a page APK corresponding to the page card.

For example, the user may tap the select button 1904 after the page card corresponding to the commodity purchase page of smart glasses and a select button after the page card corresponding to the reading page of the novel "Romance of the Three Kingdoms", and then tap the delete button 1905. The mobile phone may delete the page card corresponding to the commodity purchase page of smart glasses, the page1 APK, the page card corresponding to the reading page of the novel "Romance of the Three Kingdoms", and the page2 APK in response to the operations performed by the user.

In this manner, efficiency of actively removing the page card and the page APK by the user can be improved.

Optionally, as still shown in FIG. 19B, the application interface of the virtual app may further include a select all button 1906, and the user may tap the select all button 1906 to select all page cards. When the user taps the select all button 1906 and taps the delete button 1905, the mobile phone may delete all the page cards and all page APKs in response to the operation.

In an implementation, the function of deleting the page APK and the page card may alternatively be implemented by the base APK in the virtual app. The base APK may maintain a page info table, and the page info table may include identification information (for example, page IDs) of all page APKs. The page info table may be used to establish a mapping relationship between a page card and a page APK. When a delete operation on a page card is triggered, the base APK may search the page info table, delete identification information of a page APK corresponding to the page card from the page info table, and delete the corresponding page APK. It should be understood that when a new page APK is downloaded, the base APK may write identification information of the newly downloaded page APK into the page info table. That is, the base APK may manage the page APK based on the page info table.

The operations of tapping and touching and holding a page card and tapping the delete button 1902 by the user, or the operations of tapping and touching and holding a page card, sequentially selecting page cards, and tapping the delete button 1905 by the user are all operations of deleting the page card by the user. In this application, the operation of deleting the page card by the user may be referred to as a fourth operation.

Optionally, in this embodiment of this application, when making the first file based on the third-party page, the provider of the third page may generate check information of the first file. The provider of the third-party page may write both the check information of the first file and the identification information of the first file into the NFC tag, and upload both the check information of the first file and the first file to the first platform. When performing the first interaction operation with the NFC tag, the mobile phone may obtain the identification information of the first file and the check information of the first file that are included in the NFC tag. The mobile phone may download the first file and the check information of the first file from the first platform by using the virtual app based on the identification information of the first file. After downloading the first file and the check information of the first file from the first platform, the mobile phone may first check whether the check information that is of the first file and that is included in the NFC tag is consistent with the check information of the first file downloaded from the first platform. When the check information that is of the first file and that is included in the NFC tag is consistent with the check information of the first file downloaded from the first platform, the mobile phone caches the first file by using the virtual app, and displays the third-party page based on the first file. When the check information that is of the first file and that is included in the NFC tag is inconsistent with the check information of the first file downloaded from the first platform, the mobile phone deletes the first file by using the virtual app, and displays second prompt information by using the application interface of the virtual app. The second prompt information prompts the user with information indicating that the check on the first file fails. For example, the second prompt information may include "the check on the first file fails" or "the first file may be corrupted or tampered with". Specific content of the second prompt information is not limited in this application.

The check information of the first file may include a check signature, a package name, and the like of the first file. This is not limited herein either.

For example, the first platform is an application market, and the first file is the page2 APK. The application market may include the page2 APK and check information of the page2 APK. The NFC tag may include the identification information of the page2 APK and check information of the page2 APK. The mobile phone performs the first interaction operation with the NFC tag, and may obtain the identification information of the page2 APK and the check information of the page2 APK that are included in the NFC tag. Then, the mobile phone may send a request for downloading the page2 APK to the application market by using the virtual app based on the identification information of the page2 APK. The application market may deliver the page2 APK and the check information of the page2 APK to the mobile phone based on the request for downloading the page2 APK. After receiving the page2 APK and the check information of the page2 APK, the mobile phone may first check whether the check information of the page2 APK delivered by the application market is consistent with the check information of the page2 APK included in the NFC tag. When the check information of the page2 APK delivered by the application market is consistent with the check information of the page2 APK included in the NFC tag, the mobile phone caches the page2 APK by using the virtual app, and displays page2 based on the page2 APK. When the check information of the page2 APK delivered by the application market is inconsistent with the check information of the page2 APK included in the NFC tag, the mobile phone deletes the page2 APK by using the virtual app, and prompts, by using the application interface of the virtual app, the user with information indicating that the check on the page2 APK fails.

It should be noted that the foregoing check manner is merely an example for description. A check manner of the first file is not limited in this application.

For example, in some other embodiments, when making the first file based on the third-party page, the provider of the third page may encrypt the first file by using an encryption algorithm, and generate a key of the first file. The key may be used to decrypt the encrypted first file. The provider of the third-party page may write both the key of the first file and the identification information of the first file into the NFC tag, and upload the encrypted first file to the first platform. When performing the first interaction operation with the NFC tag, the mobile phone may obtain the identification information of the first file and the key of the first file that are included in the NFC tag. The mobile phone may download the encrypted first file from the first platform by using the virtual app based on the identification information of the first file. After downloading the encrypted first file from the first platform, the mobile phone needs to first decrypt the first file by using the key that is of the first file and that is included in the NFC tag. When the decryption succeeds, the mobile phone caches the first file by using the virtual app, and displays the third-party page based on the first file. When the decryption fails, the mobile phone deletes the first file by using the virtual app, and displays second prompt information by using the application interface of the virtual app. For the second prompt information, refer to the descriptions in the foregoing embodiment.

Optionally, the function of checking the first file by the mobile phone may alternatively be implemented by the page management module (for example, the base APK) in the virtual app.

Optionally, in this embodiment of this application, the first file includes only display-related content of the corresponding third-party page. A package of the first file is small, and when the first file is downloaded at a current mobile data network speed of the mobile phone, there can be a download time at an ms level.

In the foregoing embodiment, a specific implementation process of the page display method provided in this embodiment of this application is mainly described by using an example in which the first application is a virtual app, the first object is an NFC tag, and the first platform is an application market.

Optionally, in some other embodiments of this application, the terminal device may further include a first module. The provider of the third-party page may further upload the first file to the first module in advance (the first file includes the identification information of the first file). After the mobile phone performs the first interaction operation with the NFC tag to obtain the identification information that is of the first file and that is included in the NFC tag, the mobile phone may directly start the corresponding first file from the first module based on the identification information of the first file, and display the corresponding third-party page based on the first file.

For example, the first module may be a Huawei mobile services core (HMS core). Based on the foregoing embodiment, the provider of the third-party page may further upload the first file to the HMS core in advance (the first file includes the identification information of the first file). After the mobile phone performs the first interaction operation with the NFC tag to obtain the identification information that is of the first file and that is included in the NFC tag, the mobile phone may directly start the corresponding first file from the HMS core based on the identification information of the first file, and display the corresponding third-party page based on the first file.

Figure 20:
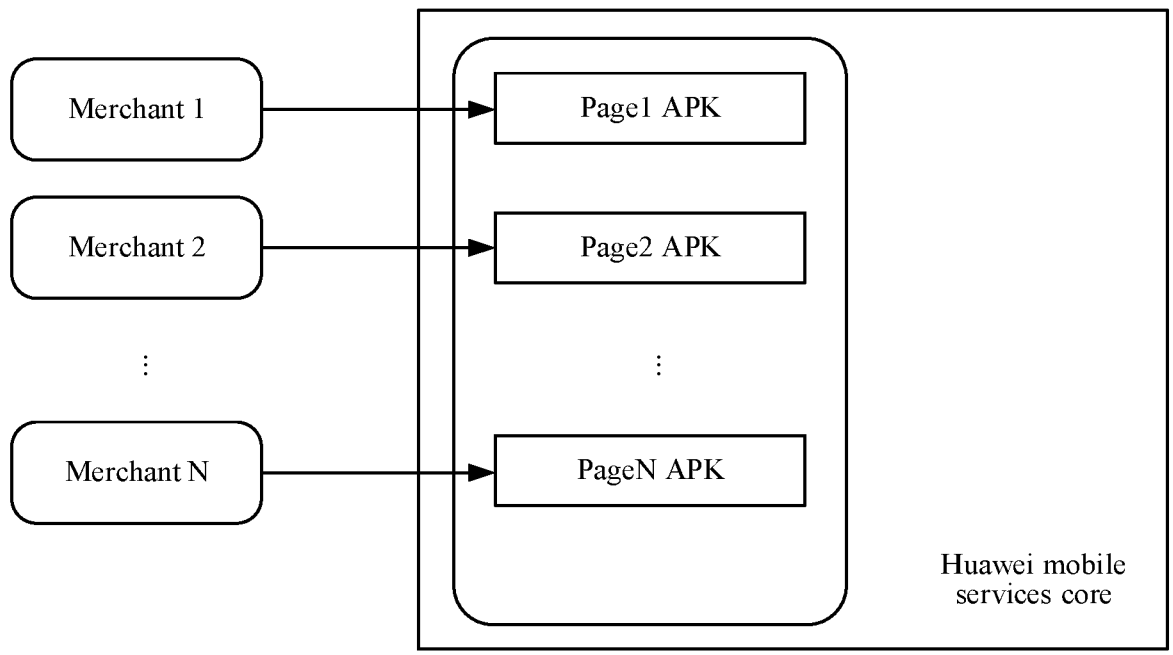
FIG. 20 is a schematic diagram of uploading a first file to an HMS core according to an embodiment of this application.

Similarly, an example in which the operating system of the mobile phone is an Android™ system and the format of the first file is an APK format is used. FIG. 20 is a schematic diagram of uploading the first file to the HMS core according to an embodiment of this application. As shown in FIG. 20, the provider of the third-party page may include a merchant 1, a merchant 2, . . . , and a merchant N (N is an integer greater than 0) A third-party page that may be provided by the merchant 1 is page1, a first file made by the merchant 1 based on page1 may be a page1 APK, and the merchant 1 may upload the page1 APK to the HMS core. A third-party page that may be provided by the merchant 2 is page2, a first file made by the merchant 2 based on page2 may be a page2 APK, and the merchant 2 may upload the page2 APK to the HMS core. By analogy, a third-party page that may be provided by the merchant N is pageN, a first file made by the merchant N based on pageN may be a pageN APK, and the merchant N may upload the pageN APK to the HMS core.

After the mobile phone performs the first interaction operation with the NFC tag to obtain identification information of the page APK included in the NFC tag, the mobile phone may directly start the corresponding page APK from the HMS core based on the identification information of the page APK, and display a corresponding page based on the page APK.

Figure 21:
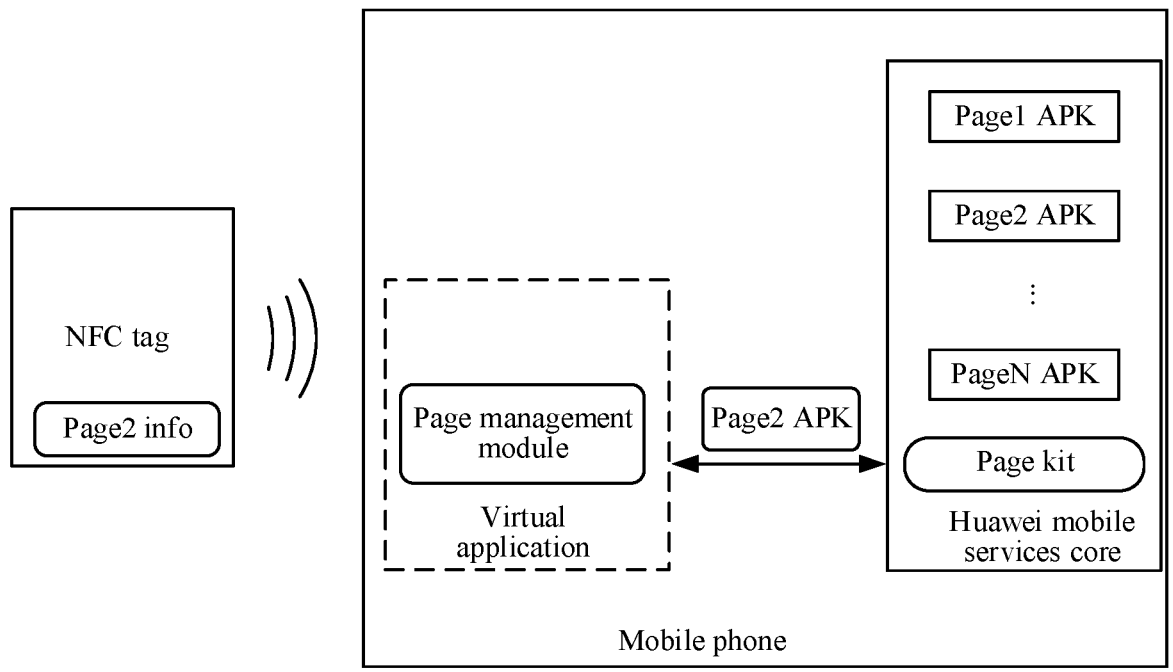
FIG. 21 is a schematic diagram in which a mobile phone starts a page2 APK from an HMS core according to an embodiment of this application.

For example, FIG. 21 is a schematic diagram in which the mobile phone starts the page2 APK from the HMS core according to an embodiment of this application. As shown in FIG. 21, a first component, for example, a page kit, may be preconfigured in the HMS core. The mobile phone may start the page2 APK from the HMS core by using the page kit based on identification information of the page2 APK. Then, the base APK in the virtual app may load, to the class loader by modifying the class loader through reflection, the page2 APK started from the HMS core, and invoke the router activity to jump to and display the corresponding third-party page, namely, page2.

Compared with the manner in which the mobile phone downloads the page APK from the application market and makes a jump in the foregoing embodiment, in this embodiment, the manner in which the mobile phone directly starts the page APK from the HMS core and makes a jump consumes a shorter time overall and achieves higher efficiency. In addition, in the manner in which the mobile phone directly starts the page APK from the HMS core and makes a jump, an offline jump may be further implemented in some scenarios.

Optionally, when the HMS core does not include the page APK corresponding to the identification information of the page APK included in the NFC tag, the page kit cannot find the corresponding page APK through matching based on the identification information of the page APK included in the NFC tag. In this case, the mobile phone may download the corresponding page APK from the application market by using the virtual app in the manner described in the foregoing embodiment.

Figure 22:
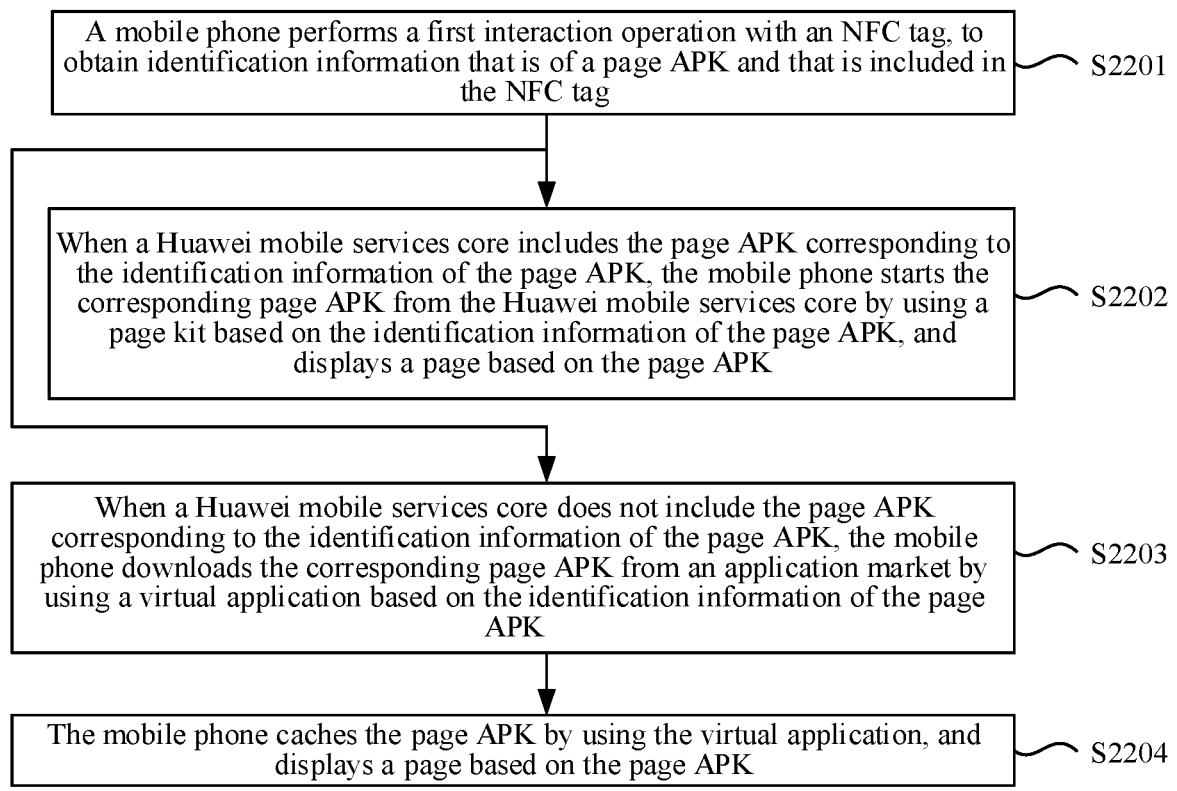
FIG. 22 is another schematic flowchart of a page display method according to an embodiment of this application.

For example, the first file is a page APK. FIG. 22 is another schematic flowchart of a page display method according to an embodiment of this application. As shown in FIG. 22, the method may include S2201 to S2204.

S2201: A mobile phone performs a first interaction operation with an NFC tag, to obtain identification information of a page APK included in the NFC tag.

S2202: When an HMS core includes the page APK corresponding to the identification information of the page APK, the mobile phone starts the corresponding page APK from the HMS core by using a page kit based on the identification information of the page APK, and displays a page based on the page APK.

S2203: When an HMS core does not include the page APK corresponding to the identification information of the page APK, the mobile phone downloads the corresponding page APK from an application market by using a virtual app based on the identification information of the page APK.

S2204: The mobile phone caches the page APK by using the virtual app, and displays a page based on the page APK.

Optionally, in some other embodiments, the function of downloading a page APK from an application market and updating the page APK by a base APK in a virtual app in the foregoing embodiment may be implemented on the page kit in the HMS core.

For example, after the mobile phone performs the first interaction operation with the NFC tag, to obtain the identification information of the page APK included in the NFC tag, and the HMS core does not include the page APK corresponding to the identification information of the page APK included in the NFC tag, the mobile phone may download the corresponding page APK from the application market by using the page kit based on the identification information of the page APK.

Figure 23:
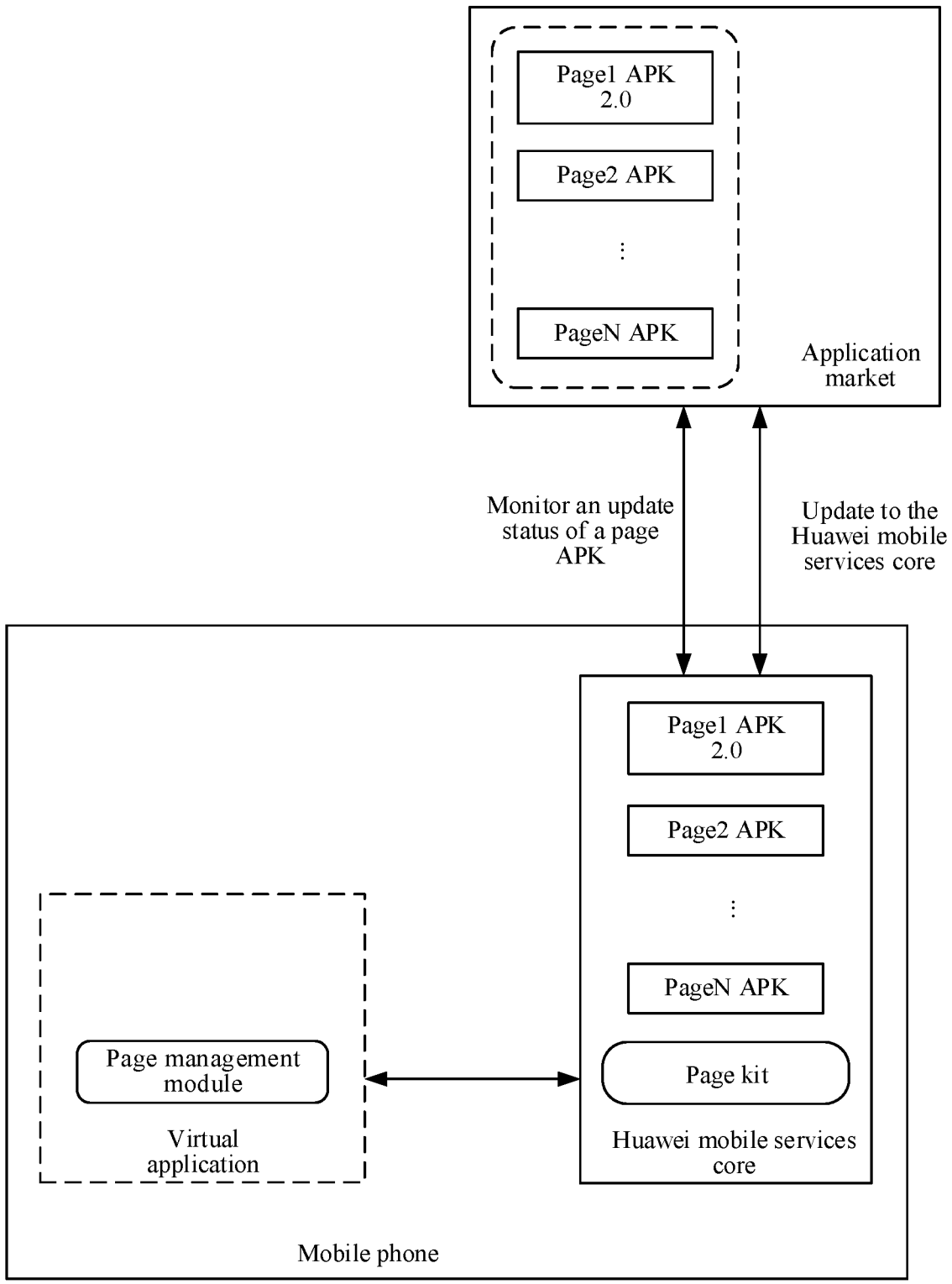
FIG. 23 is a schematic diagram in which a page kit updates a page APK from an application market according to an embodiment of this application.

For another example, FIG. 23 is a schematic diagram in which the page kit updates a page APK from the application market according to an embodiment of this application. As shown in FIG. 23, it is assumed that a page1 APK cached in the page kit in the HMS core is of a version 1.0. However, the page1 APK in the application market is updated to a version 2.0. In this case, when querying version information of the page1 APK in the application market in a background of the mobile phone by using an interface based on a preset period, the page kit may detect, in a timely manner, that a page status of the page1 APK is changed from the version 1.0 to the version 2.0.

When detecting that the page status of the page1 APK is changed from the version 1.0 to the version 2.0, the page kit may automatically download the page1 APK of the version 2.0 from the application market, and update the page1 APK of the version 1.0 in the HMS core to the page1 APK of the version 2.0.

Corresponding to the page display method in the foregoing embodiments, an embodiment of this application further provides a page display system. The page display system may include a terminal device, a server, and a first object. The terminal device is connected to the server. The server includes at least one first file, and the first file is related to a first page. The first object is an NFC tag, a device including an NFC tag, a two-dimensional code label, a device capable of displaying a two-dimensional code, or a first electronic device that wirelessly communicates with the terminal device. For example, for a structure of the page display system, refer to the structure included in the application scenario shown in FIG. 4. In the page display system, the terminal device is configured to perform the page display method in the foregoing embodiments.

Figure 24:
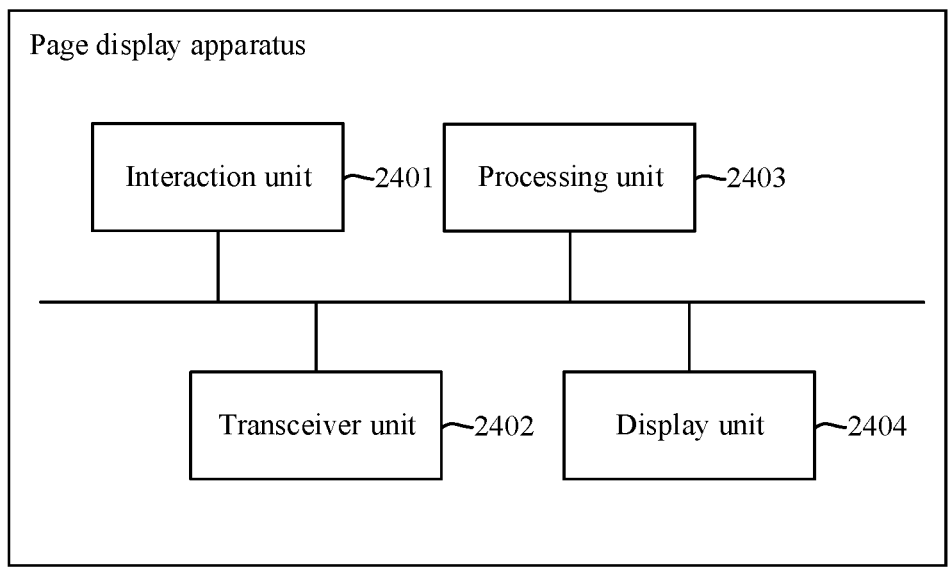
FIG. 24 is a schematic diagram of a structure of a page display apparatus according to an embodiment of this application.

Optionally, an embodiment of this application further provides a page display apparatus. The page display apparatus may be applied to the foregoing terminal device, to implement the page display method in embodiments of this application. A function of the apparatus may be implemented by hardware, or may be implemented by hardware by executing corresponding software. The hardware or the software includes one or more modules or units corresponding to the function. For example, FIG. 24 is a schematic diagram of a structure of a page display apparatus according to an embodiment of this application. As shown in FIG. 24, the page display apparatus provided in this embodiment of this application may include an interaction unit 2401, a transceiver unit 2402, a processing unit 2403, and a display unit 2404.

The interaction unit 2401 is configured to perform a first interaction operation with a first object, to obtain identification information that is of a first file and that is included in the first object. For example, the interaction unit 2401 may be an NFC chip.

The processing unit 2403 is configured to download the corresponding first file from a server through the transceiver unit 2402 based on the identification information of the first file.

The processing unit 2403 is further configured to: store the first file, and display a corresponding first page through the display unit 2404 based on the first file.

The processing unit 2403 is further configured to: receive a first operation: and display the first page again through the display unit 2404 in response to the first operation. The first operation is an operation of opening the first page by a user.

The first object may be an NFC tag, a device including an NFC tag, a two-dimensional code label, a device capable of displaying a two-dimensional code, or a first electronic device that wirelessly communicates with a terminal device.

For example, the first file may include the identification information of the first file. The identification information of the first file may be a page name, a page ID, or the like of the first page.

The first page may be a third-party page. For example, the first page may include any one of the following: a commodity purchase page, an advertisement page, a web page, a payment page, an official account page, a video display page, and an article display page.

In some embodiments, the processing unit 2403 is further configured to learn, from the server through the transceiver unit 2402 based on the identification information of the first file, whether the first file is updated. When the first file is updated, the processing unit 2403 display's an update reminder of the first file through the display unit 2404.

Optionally, the processing unit 2403 is further configured to: receive a second operation: download a second file from the server through the transceiver unit 2402 in response to the second operation: and replace the first file with the second file. The second file is a file obtained after the first file is updated.

In some other embodiments, the processing unit 2403 is further configured to learn, from the server through the transceiver unit 2402 based on the identification information of the first file, whether the first file is updated. When the first file is updated, the processing unit 2403 automatically downloads a second file from the server through the transceiver unit 2402; and replaces the first file with the second file. The second file is a file obtained after the first file is updated.

Optionally, the terminal device includes a silent upgrade switch. The processing unit 2403 is specifically configured to: when the silent upgrade switch is turned on, automatically download the second file from the server through the transceiver unit 2402.

In some embodiments, the processing unit 2403 is further configured to display a first interface through the display unit 2404. The first interface includes a first card corresponding to the first page, and the first card includes a page identifier of the first page and/or an identifier of a page type of the first page. The first operation is an operation of tapping or touching the first card in the first interface.

In some other embodiments, the processing unit 2403 is further configured to display a first interface through the display unit 2404. The first interface includes a first folder, the first folder includes at least one card, a first card is a card in the at least one card, and the first card includes a page identifier of the first page and/or an identifier of a page type of the first page. The processing unit 2403 is further configured to: receive a third operation: and display a second interface through the display unit 2404 in response to the third operation. The second interface includes the card in the first folder. The third operation is an operation of opening the first folder by the user. The first operation is an operation of tapping or touching the first card in the second interface.

Optionally, page types of cards included in the first folder are the same: and the first interface further includes a second folder, the second folder includes at least one card, and a page type of the card included in the second folder is different from the page type of the card included in the first folder.

Optionally, the processing unit 2403 is further configured to: receive a fourth operation: and delete the first card and the first file in response to the fourth operation. The fourth operation is an operation of deleting the first card by the user.

Optionally, the processing unit 2403 is further configured to display a third interface through the display unit 2404. The third interface includes a functional control corresponding to a start portal of the first interface, and the third interface is a leftmost screen, a home screen, or a drop-down interface. The processing unit 2403 receives a fifth operation: and displays the first interface through the display unit 2404 in response to the fifth operation. The fifth operation is an operation of tapping, by the user, the functional control corresponding to the start portal of the first interface.

In some embodiments, the server and the first object each further include check information of the first file. The interaction unit 2401 is specifically configured to perform the first interaction operation with the first object, to obtain the identification information of the first file and the check information of the first file that are included in the first object.

The processing unit 2403 is specifically configured to download the corresponding first file and the check information of the first file from the server through the transceiver unit 2402 based on the identification information of the first file. When the processing unit 2403 learns, through check, that the check information of the first file downloaded from the server is consistent with the check information that is of the first file and that is included in the first object, the processing unit 2403 stores the first file, and displays the corresponding first page through the display unit 2404 based on the first file.

The check information of the first file may include a check signature, a package name, and the like of the first file.

Optionally, when the processing unit 2403 learns, through check, that the check information of the first file downloaded from the server is inconsistent with the check information that is of the first file and that is included in the first object, the processing unit 2403 displays, through the display unit 2404, prompt information indicating that the check on the first file fails.

In some other embodiments, the first file included in the server is an encrypted file, and the first object further includes a key of the first file. The interaction unit 2401 is specifically configured to perform the first interaction operation with the first object, to obtain the identification information of the first file and the key of the first file that are included in the first object.

When the processing unit 2403 is capable of decrypting the first file based on the key that is of the first file and that is included in the first object, the processing unit 2403 stores the first file, and displays the corresponding first page through the display unit 2404 based on the first file.

Optionally, the terminal device includes a first module, the first module includes at least one first file, and the first file is related to the first page. The processing unit 2403 is further configured to: when the first module includes the first file corresponding to the identification information of the first file, directly start the corresponding first file from the first module, and display the corresponding first page through the display unit 2404 based on the first file.

For example, the first module may be a Huawei mobile services core (HMS core).

Optionally, the processing unit 2403 is specifically configured to: when the first module does not include the first file corresponding to the identification information of the first file, download the corresponding first file from the server through the transceiver unit 2402 based on the identification information of the first file.

It may be understood that all functions corresponding to the page display method in the foregoing embodiments of this application may be implemented by using the page display apparatus. Details are not described herein.

It should be understood that division into the units (or referred to as the modules) in the apparatus is merely logical function division. In actual implementation, all or some of the units may be integrated into one physical entity, or may be physically separated. In addition, all of the units in the apparatus may be implemented in a form of software invoked by a processing element, or may be implemented in a form of hardware: or some units may be implemented in a form of software invoked by a processing element, and some units are implemented in a form of hardware.

For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, the steps in the foregoing methods or the foregoing units may be implemented by using an integrated logic circuit of hardware in a processor element, or may be implemented in a form of software invoked by a processing element.

In an example, the units in the foregoing apparatus may be configured as one or more integrated circuits for implementing the foregoing method, for example, one or more application-specific integrated circuits (ASICs), one or more digital signal processors (DSPs), one or more field programmable gate arrays (FPGAs), or a combination of at least two of these integrated circuits.

For another example, when the units in the apparatus may be implemented in a form of scheduling a program by a processing element, the processing element may be a general-purpose processor, for example, a central processing unit (CPU) or another processor that can invoke the program. For still another example, the units may be integrated and implemented in a form of a system-on-a-chip (SoC).

In an implementation, the unit used by the apparatus to implement the corresponding steps in the foregoing methods may be implemented in a form of scheduling a program by a processing element. For example, the apparatus may include a processing element and a storage element. The processing element invokes a program stored in the storage element, to perform the method in the foregoing method embodiments. The storage element may be a storage element, namely, an on-chip storage element, located on a same chip as the processing element.

In another implementation, the program for performing the foregoing method may be in a storage element, namely, an off-chip storage element, on a chip different from that of the processing element. In this case, the processing element invokes or loads the program from the off-chip storage element to the on-chip storage element, to invoke and perform the method in the foregoing method embodiments.

For example, an embodiment of this application may further provide an apparatus, for example, an electronic device. The electronic device may include a processor, a memory, and a computer program. The computer program is stored in the memory. When the computer program is executed by the processor, the electronic device is enabled to implement the page display method in the foregoing embodiments. The memory may be located inside the electronic device, or may be located outside the electronic device. In addition, there are one or more processors.

The electronic device may be a mobile phone, a tablet computer, a wearable device (for example, a smartwatch or a smart band), a vehicle-mounted device, an augmented reality (AR)/virtual reality (VR) device, a notebook computer, an ultra-mobile personal computer (UMPC), a netbook, a personal digital assistant (PDA), or the like.

In still another implementation, the unit used by the apparatus to implement the steps in the foregoing methods may be configured as one or more processing elements. The processing element herein may be an integrated circuit, for example, one or more ASICs, one or more DSPs, one or more FPGAs, or a combination of these types of integrated circuits. These integrated circuits may be integrated together to form a chip.

For example, an embodiment of this application further provides a chip. The chip may be applied to the foregoing electronic device. The chip includes one or more interface circuits and one or more processors. The interface circuit and the processor are interconnected by using a line. The processor receives computer instructions from a memory of the electronic device and executes the computer instructions by using the interface circuit, to implement the page display method in the foregoing embodiments.

An embodiment of this application further provides a computer program product, including computer-readable code. When the computer-readable code runs in an electronic device, the electronic device is enabled to implement the page display method in the foregoing embodiments.

The foregoing descriptions about implementations allow a person skilled in the art to clearly understand that for the purpose of convenient and brief description, division into the foregoing functional modules is used only as an example for illustration. In actual application, the foregoing functions may be allocated to different functional modules and implemented based on requirements, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located at one position, or may be distributed at different positions. Some or all of the units may be selected based on actual requirements to achieve the objectives of the solutions in embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium.

Based on such an understanding, the technical solutions in embodiments of this application essentially, or the part contributing to the conventional technology, or all or some of the technical solutions may be implemented in a form of a software product, for example, a program. The software product is stored in a program product, for example, a computer-readable storage medium, and includes several instructions for instructing a device (which may be a single-chip microcomputer, a chip, or the like) or a processor to perform all or some of the steps in the methods in embodiments of this application. The storage medium includes any medium that can store program code, for example, a USB flash drive, a removable hard disk, a ROM, a RAM, a magnetic disk, or an optical disc.

For example, an embodiment of this application may further provide a computer-readable storage medium. The computer-readable storage medium includes a computer program. When the computer program runs on an electronic device, the electronic device is enabled to implement the page display method in the foregoing embodiments.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A page display method, wherein the method is applied to a terminal device, wherein the terminal device is in communication with a server, and wherein the server comprises a first file, and the first file is related to a first page, the method comprising:
  performing, by the terminal device, a first interaction operation with a first object to obtain identification information that is of the first file and that is comprised in the first object, wherein the first object is a near field communication (NFC) tag, a device comprising an NFC tag, a two-dimensional code label, a device capable of displaying a two-dimensional code, or a first electronic device that wirelessly communicates with the terminal device;
  downloading, by the terminal device, the first file from the server based on the identification information of the first file;
  storing, by the terminal device, the first file, and displaying the first page based on the first file;
  receiving, by the terminal device, a first operation, wherein the first operation is an operation of opening the first page by a user;
  displaying, by the terminal device, the first page again in response to the first operation;

learning, by the terminal device from the server based on the identification information of the first file, whether the first file is updated;

based on the first file being updated, automatically downloading, by the terminal device, a second file from the server, wherein the second file is a file obtained after the first file is updated; and replacing, by the terminal device, the first file with the second file.

2. The method according to claim 1, wherein the method further comprises:

learning, by the terminal device from the server based on the identification information of the first file, whether the first file is updated; and based on the first file being updated, displaying, by the terminal device, an update reminder of the first file.

3. The method according to claim 2, wherein the method further comprises:

receiving, by the terminal device, a second operation;

downloading, by the terminal device, a third file from the server in response to the second operation, wherein the third file is a file obtained after the first file is updated; and replacing, by the terminal device, the first file with the third file.

4. The method according to claim 3, wherein the terminal device comprises a silent upgrade switch, and the downloading, by the terminal device, the third file from the server comprises:

based on the silent upgrade switch being turned on, automatically downloading, by the terminal device, the third file from the server.

5. The method according to claim 1, wherein after the storing, by the terminal device, the first file, the method further comprises:

displaying, by the terminal device, a first interface, wherein the first interface comprises a first card, the first card is associated with the first page, and the first card comprises a page identifier of the first page and/or an identifier of a page type of the first page;

wherein the first operation is an operation of tapping or touching the first card in the first interface.

6. The method according to claim 5, wherein the method further comprises:

receiving, by the terminal device, a fourth operation, wherein the fourth operation is an operation of deleting the first card by the user; and deleting, by the terminal device, the first card and the first file in response to the fourth operation.

7. The method according to claim 5, wherein before the displaying, by the terminal device, the first interface, the method further comprises:

displaying, by the terminal device, a third interface, wherein the third interface comprises a functional control corresponding to a start portal of the first interface, and the third interface is a leftmost screen, a home screen, or a drop-down interface;

wherein the displaying, by the terminal device, the first interface comprises:

receiving, by the terminal device, a fifth operation, wherein the fifth operation is an operation of tapping, by the user, the functional control corresponding to the start portal of the first interface; and displaying, by the terminal device, the first interface in response to the fifth operation.

8. The method according to claim 1, wherein after the storing, by the terminal device, the first file, the method further comprises:

displaying, by the terminal device, a first interface, wherein the first interface comprises a first folder, the first folder comprises at least one card, the at least one card comprises a first card, the first card is associated with the first page, and the first card comprises a page identifier of the first page and/or an identifier of a page type of the first page;

receiving, by the terminal device, a third operation, wherein the third operation is an operation of opening the first folder by the user; and displaying, by the terminal device, a second interface in response to the third operation, wherein the second interface comprises the card in the first folder;

wherein the first operation is an operation of tapping or touching the first card in the second interface.

9. The method according to claim 8, wherein page types of cards comprised in the first folder are the same; and wherein the first interface further comprises a second folder, the second folder comprises at least one card, and a page type of a card comprised in the second folder is different from the page type of the cards comprised in the first folder.

10. The method according to claim 1, wherein the first page comprises any one of the following: a commodity purchase page, an advertisement page, a web page, a payment page, an official account page, a video display page, or an article display page.

11. The method according to claim 1, wherein the server and the first object each further comprise check information of the first file;

wherein the performing, by the terminal device, the first interaction operation with the first object, to obtain the identification information that is of the first file and that is comprised in the first object comprises:

performing, by the terminal device, the first interaction operation with the first object, to obtain the identification information of the first file and the check information of the first file that are comprised in the first object;

wherein the downloading, by the terminal device, the corresponding first file from the server based on the identification information of the first file comprises:

downloading, by the terminal device, the corresponding first file and the check information of the first file from the server based on the identification information of the first file; and wherein the storing, by the terminal device, the first file, and displaying the first page based on the first file comprises:

based on the terminal device learning, through check, that the check information of the first file downloaded from the server is consistent with the check information that is of the first file and that is comprised in the first object, storing, by the terminal device, the first file, and displaying the first page based on the first file.

12. The method according to claim 11, wherein the method further comprises:

based on the terminal device learning, through check, that the check information of the first file downloaded from the server is inconsistent with the check information that is of the first file and that is comprised in the first object, displaying, by the terminal device, prompt information indicating that the check on the first file fails.

13. The method according to claim 1,
wherein the first file comprised in the server is an encrypted file, and the first object further comprises a key of the first file;
wherein the performing, by the terminal device, the first interaction operation with the first object to obtain the identification information that is of the first file and that is comprised in the first object comprises:
  performing, by the terminal device, the first interaction operation with the first object, to obtain the identification information of the first file and the key of the first file that are comprised in the first object; and
wherein the storing, by the terminal device, the first file, and displaying the first page based on the first file comprises:
  based on the terminal device being capable of decrypting the first file based on the key that is of the first file and that is comprised in the first object, storing, by the terminal device, the first file, and displaying the first page based on the first file.

14. The method according to claim 1,
wherein the terminal device comprises a services program, the services program comprises at least one file, and the at least one file is related to the first page;
wherein after the performing, by the terminal device, the first interaction operation with the first object to obtain the identification information that is of the first file and that is comprised in the first object, the method further comprises:
  based on the services program comprising the first file corresponding to the identification information of the first file, directly starting, by the terminal device, the first file from the services program, and displaying the first page based on the first file; and
wherein the downloading, by the terminal device, the first file from the server based on the identification information of the first file comprises:
  based on the services program not comprising the first file corresponding to the identification information of the first file, downloading, by the terminal device, the first file from the server based on the identification information of the first file.

15. An electronic device, comprising:
a processor; and
a memory storing a computer program, wherein when the computer program is executed by the processor, the electronic device is enabled to implement operations comprising:
performing a first interaction operation with a first object to obtain identification information that is of a first file and that is comprised in the first object, wherein the first file is related to a first page, and wherein the first object is a near field communication (NFC) tag, a device comprising an NFC tag, a two-dimensional code label, a device capable of displaying a two-dimensional code, or a first electronic device that wirelessly communicates with the terminal device;
downloading the first file from a server based on the identification information of the first file;
storing the first file, and displaying the first page based on the first file;
receiving a first operation, wherein the first operation is an operation of opening the first page by a user;
displaying the first page again in response to the first operation;
learning, by the terminal device from the server based on the identification information of the first file, whether the first file is updated;
based on the first file being updated, automatically downloading, by the terminal device, a second file from the server, wherein the second file is a file obtained after the first file is updated; and
replacing, by the terminal device, the first file with the second file.

16. The electronic device according to claim 15, wherein the operations further comprise:
  learning, from the server based on the identification information of the first file, whether the first file is updated; and
  based on the first file being updated, displaying an update reminder of the first file.

17. The electronic device according to claim 15, wherein the operations further comprise:
  receiving a second operation;
  downloading a third file from the server in response to the second operation, wherein the third file is a file obtained after the first file is updated; and
  replacing the first file with the third file.

18. The electronic device according to claim 15, wherein the operations further comprise:
  learning, from the server based on the identification information of the first file, whether the first file is updated;
  based on the first file being updated, automatically downloading a third file from the server, wherein the third file is a file obtained after the first file is updated; and
  replacing the first file with the third file.

19. A non-transitory computer-readable storage medium storing a computer program that, when executed on an electronic device, causes the electronic device to implement operations comprising:
  performing a first interaction operation with a first object to obtain identification information that is of a first file and that is comprised in the first object, wherein the first file is related to a first page, and wherein the first object is a near field communication (NFC) tag, a device comprising an NFC tag, a two-dimensional code label, a device capable of displaying a two-dimensional code, or a first electronic device that wirelessly communicates with the terminal device;
  downloading the first file from a server based on the identification information of the first file;
  storing the first file, and displaying the first page based on the first file;
  receiving a first operation, wherein the first operation is an operation of opening the first page by a user;
  displaying the first page again in response to the first operation;
  learning, by the terminal device from the server based on the identification information of the first file, whether the first file is updated;
  based on the first file being updated, automatically downloading, by the terminal device, a second file from the server, wherein the second file is a file obtained after the first file is updated; and
  replacing, by the terminal device, the first file with the second file.

* * * * *